United States Patent
Sengupta et al.

(10) Patent No.: US 11,997,630 B2
(45) Date of Patent: May 28, 2024

(54) UPDATING AN UPLINK-DOWNLINK TIMING INTERACTION OFFSET

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 17/393,975

(22) Filed: Aug. 4, 2021

(65) Prior Publication Data

US 2022/0046572 A1    Feb. 10, 2022

Related U.S. Application Data

(60) Provisional application No. 62/706,291, filed on Aug. 7, 2020.

(51) Int. Cl.
*H04W 56/00* (2009.01)
*H04L 1/1812* (2023.01)

(52) U.S. Cl.
CPC ....... *H04W 56/0045* (2013.01); *H04L 1/1812* (2013.01)

(58) Field of Classification Search
CPC ............. H04W 56/0045; H04W 56/00; H04W 74/0833; H04W 72/23; H04L 1/1812; H04B 7/2125; H04B 7/1851; H04B 7/18504; H04B 7/1853; G01S 19/29
See application file for complete search history.

(56) References Cited

U.S. PATENT DOCUMENTS

| | | | | |
|---|---|---|---|---|
| 2006/0280199 | A1* | 12/2006 | Lane | H04L 27/2614 370/328 |
| 2019/0349077 | A1* | 11/2019 | Alasti | H04B 7/2125 |
| 2019/0349877 | A1* | 11/2019 | Alasti | H04W 4/029 |
| 2022/0216912 | A1* | 7/2022 | Hu | H04B 7/1855 |

FOREIGN PATENT DOCUMENTS

| | | | | |
|---|---|---|---|---|
| CN | 105519014 A | * | 4/2016 | ........... H04B 7/2615 |
| CN | 113271135 A | * | 8/2021 | ........... H04B 7/1853 |
| KR | 20220008896 A | * | 5/2020 | ........... H04W 72/23 |
| WO | WO-2017023576 A1 | * | 2/2017 | ........... H04B 7/1851 |
| WO | WO-2017072745 A1 | * | 5/2017 | ............ G01S 19/29 |
| WO | WO-2019195457 A1 | * | 10/2019 | ......... H04B 7/18504 |
| WO | WO-2020031155 A1 | * | 2/2020 | ........... H04B 7/2125 |
| WO | WO-2020065530 A1 | * | 4/2020 | ........... H04B 7/1851 |

OTHER PUBLICATIONS

International Search Report and Written Opinion - PCT/US2021/071118—ISA/EPO—dated Dec. 1, 2021.

* cited by examiner

*Primary Examiner* — Ayaz R Sheikh
*Assistant Examiner* — Louis Samara
(74) *Attorney, Agent, or Firm* — Harrity & Harrity, LLP

(57) ABSTRACT

Various aspects of the present disclosure generally relate to wireless communication. In some aspects, a user equipment (UE) may receive an indication from a satellite that an offset between an uplink radio frame timing and a corresponding downlink radio frame timing at the UE is to be used. The UE may communicate with the satellite using the offset based at least in part on receiving the indication. Numerous other aspects are provided.

25 Claims, 14 Drawing Sheets

UPDATING AN UPLINK-DOWNLINK TIMING INTERACTION OFFSET

CROSS-REFERENCE TO RELATED APPLICATION

This patent application claims priority to U.S. Provisional Patent Application No. 62/706,291, filed on Aug. 7, 2020, entitled "UPDATING AN UPLINK-DOWNLINK TIMING INTERACTION OFFSET," and assigned to the assignee hereof. The disclosure of the prior application is considered part of and is incorporated by reference into this patent application.

INTRODUCTION

Aspects of the present disclosure generally relate to wireless communication and to techniques and apparatuses for updating an uplink-downlink timing interaction offset.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving an indication from a satellite that an offset associated with an uplink-downlink timing interaction is to be used. The method includes communicating with the satellite using the offset based at least in part on receiving the indication.

In some aspects, a method of wireless communication performed by a satellite includes updating an offset for an uplink-downlink timing interaction associated with a UE. The method includes transmitting an indication to the UE that the offset is to be used based at least in part on updating the offset.

In some aspects, a UE for wireless communication includes a memory and one or more processors coupled to the memory. The one or more processors are configured to receive an indication from a satellite that an offset associated with an uplink-downlink timing interaction is to be used. The one or more processors are configured to communicate with the satellite using the offset based at least in part on receiving the indication.

In some aspects, a satellite for wireless communication includes a memory and one or more processors coupled to the memory. The one or more processors configured to update an offset for an uplink-downlink timing interaction associated with a UE. The one or more processors are configured to transmit an indication to the UE that the offset is to be used based at least in part on updating the offset.

In some aspects, a non-transitory computer-readable medium storing a set of instructions for wireless communication includes one or more instructions that, when executed by one or more processors of a UE, cause the UE to receive an indication from a satellite that an offset associated with an uplink-downlink timing interaction is to be used. The set of instructions for wireless communication includes one or more instructions that, when executed by one or more processors of a UE, cause the UE to communicate with the satellite using the offset based at least in part on receiving the indication.

In some aspects, a non-transitory computer-readable medium storing a set of instructions for wireless communication includes one or more instructions that, when executed by one or more processors of a satellite, cause the satellite to update an offset for an uplink-downlink timing interaction associated with a UE. The set of instructions for wireless communication includes one or more instructions that, when executed by one or more processors of a UE, cause the UE to transmit an indication to the UE that the offset is to be used based at least in part on updating the offset.

In some aspects, an apparatus for wireless communication includes means for receiving an indication from a satellite that an offset associated with an uplink-downlink timing interaction is to be used. The apparatus includes means for communicating with the satellite using the offset based at least in part on receiving the indication.

In some aspects, an apparatus for wireless communication includes means for updating an offset for an uplink-downlink timing interaction associated with a UE. The apparatus includes means for transmitting an indication to the UE that the offset is to be used based at least in part on updating the offset.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
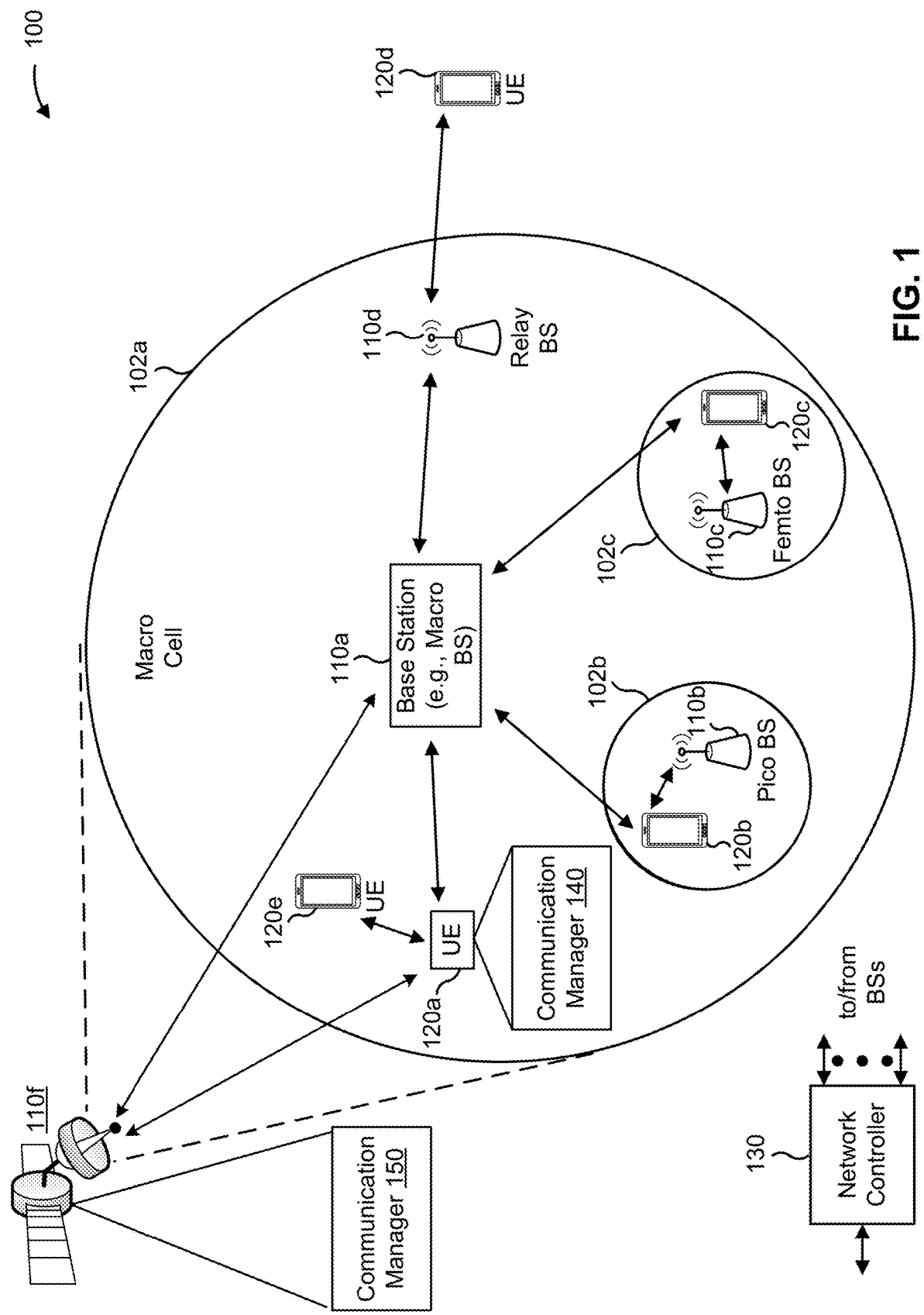
FIG. 1 is a diagram illustrating an example of a wireless network, in accordance with the present disclosure.

As described below, a non-terrestrial network (NTN) may utilize satellites or non-terrestrial base stations for providing or assisting user equipment's (UEs) with access to a core network. A non-terrestrial base station may be located on a platform, which may be, for example, a satellite (e.g., a low earth orbit (LEO) satellite, a medium earth orbit (MEO) satellite, a geostationary earth orbit (GEO) satellite, or the like), a balloon, a dirigible, an airplane, an unmanned aerial vehicle (UAV), a drone, or the like. In an NTN system, propagation delay may be significant, due to a relatively large distance between a UE and a satellite and/or a relatively large distance between a terrestrial base station and the satellite. A UE may determine, based at least in part on the propagation delay, a timing misalignment between the UE's uplink radio frame timing and the UE's downlink radio frame timing to synchronize communication with a satellite.

In some cases, the timing misalignment for a UE in a non-terrestrial cell may change over time. This may occur, for example, due to mobility of the UE, due to mobility of a satellite associated with the non-terrestrial cell, a combination thereof, and/or other factors. In cases where the transmission time index (e.g., slot/subframe index) for uplink transmissions triggered by a corresponding downlink transmission (e.g., a physical uplink shared channel (PUSCH) scheduled by a downlink control information (DCI) communication) depends on the timing misalignment at the UE, the time indices corresponding to communications comprising such uplink-downlink interactions may also need to change over time. The change in the time indices may cause uplink communication reception issues at the satellite. For example, the satellite may expect an uplink communication to arrive at the satellite at a particular time based on an offset corresponding to the communication comprising the uplink-downlink timing interaction, where the offset is based on a timing misalignment at the UE, and where the satellite assumes a value of the offset based on a timing misalignment value that it was last aware of from the UE. If (e.g., due to a change in the UE's determination of the timing misalignment) the UE subsequently updates the offset corresponding to the communication comprising the uplink-downlink timing interaction, without agreement with or without acknowledgment from the satellite, this may cause a change in the uplink time indices corresponding to the communication comprising the uplink-downlink timing interaction, that the satellite is not aware of. If the UE transmits the uplink communication based on the updated offset (which is based on the updated timing misalignment), the uplink communication may arrive at the satellite at a time other than the expected arrival time, which may cause the uplink communication to be unreceived and/or undecodable by the satellite.

Some aspects described herein provide techniques and apparatuses for updating an uplink-downlink timing interaction offset in a non-terrestrial network. In some aspects, a UE may transmit an indication of an updated timing misalignment to a satellite in a non-terrestrial network. The satellite may update an offset for an uplink-downlink timing interaction associated with the UE (e.g., based at least in part on the updated timing misalignment or independent of the updated timing misalignment). The satellite may transmit an indication to the UE to use the updated offset. In this way, the UE may wait to communicate with the satellite based at least in part on the updated offset until the UE receives an indication from the satellite that the satellite has updated the offset (e.g., which may be the indication to use the updated offset). This enables the UE and the satellite to use the updated offset in synchronous manner, which increases the likelihood that uplink communications transmitted from the UE to the satellite are receivable and decodable by the satellite.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the wireless network 100 may include one or more NTN deployments in which a non-terrestrial wireless communication device may include a satellite 110f (referred to herein, interchangeably, as a "non-terrestrial BS," "non-terrestrial base station," "satellite base station," or "satellite"), a relay station (referred to herein, interchangeably, as a "non-terrestrial relay station" or "satellite relay station"), and/or the like. As used herein, "NTN" may refer to a network for which access is facilitated by a non-terrestrial satellite, a non-terrestrial relay station, a non-terrestrial base station, and/or the like. A satellite (e.g., satellite 110f) may provide a non-terrestrial cell, which may at least partially overlap with one or more cells provided by ground-based BSs, may encompass one or more cells provided by ground-based BSs, and/or the like. In some aspects, a satellite 110f may be associated with a ground-based BS. In some aspects, a BS may be mounted on a satellite 110f.

The wireless network 100 may include any number of non-terrestrial wireless communication devices. A non-terrestrial wireless communication device may include a satellite, a high-altitude platform (HAP), and/or the like. A HAP may include a balloon, a dirigible, an airplane, an unmanned aerial vehicle, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, one or more components and/or devices included in a core network of wireless network 100, and/or the like.

As shown in FIG. 1, the UE 120 may include a communication manager 140. As described in more detail elsewhere herein, the communication manager 140 may receive an indication from the satellite 110f that an offset associated with an uplink-downlink timing interaction is to be used, may communicate with the satellite 110f using the offset based at least in part on receiving the indication. Additionally, or alternatively, the communication manager 140 may perform one or more other operations described herein.

In some aspects, the satellite 110f may include a communication manager 150. As described in more detail elsewhere herein, the communication manager 150 may update an offset for an uplink-downlink timing interaction associated with a UE 120, may transmit an indication to the UE 120 that the offset is to be used based at least in part on updating the offset, and/or the like. Additionally, or alternatively, the communication manager 150 may perform one or more other operations described herein.

As indicated above, FIG. 1 is provided merely as an example. Other examples may differ from what is described with regard to FIG. 1.

Figure 2:
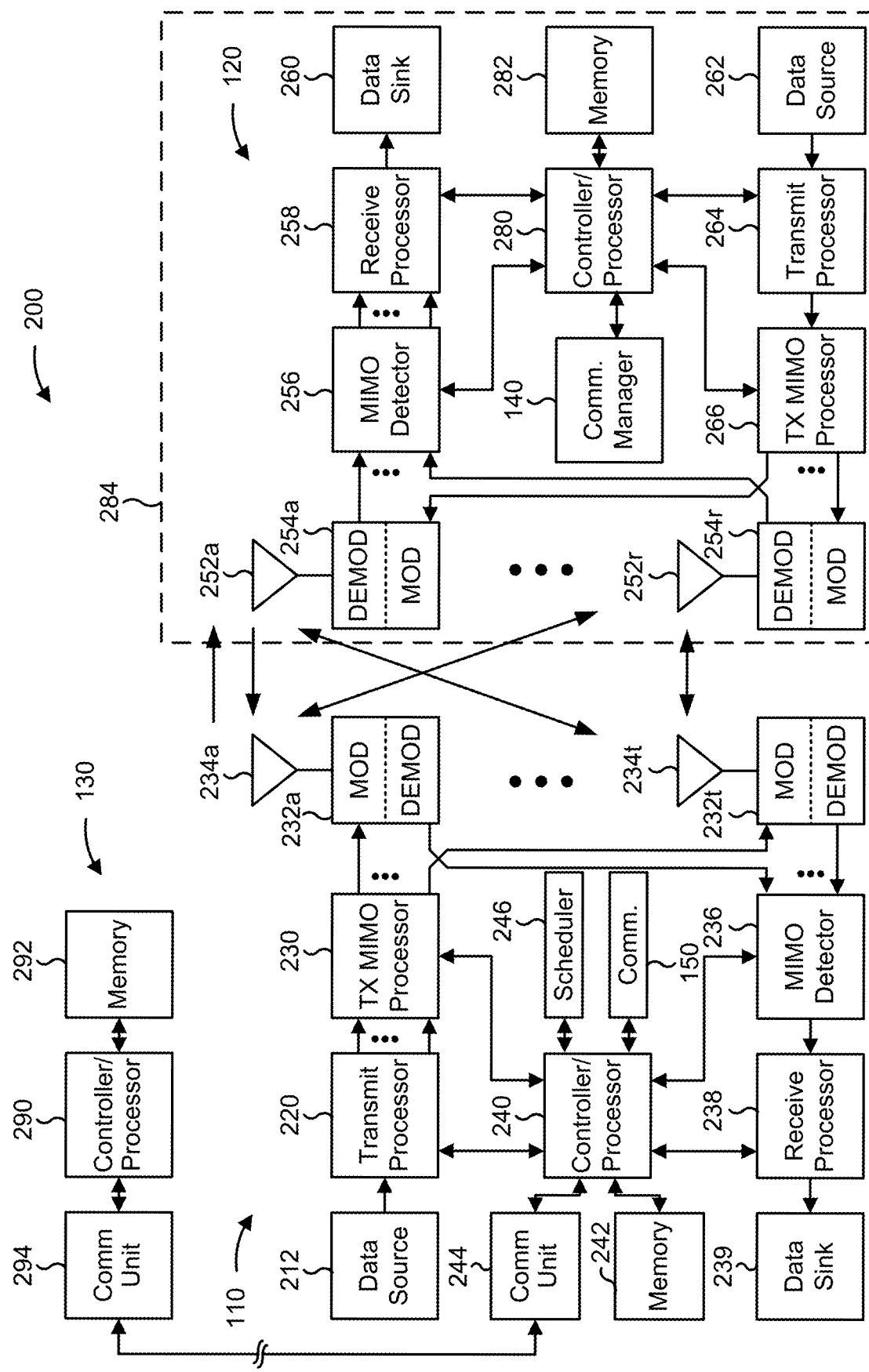
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with updating an uplink-downlink timing interaction offset in a non-terrestrial network, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 (e.g., satellite 110f) to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 may include means for receiving an indication from a satellite 110f that an offset associated with an uplink-downlink timing interaction is to be used, means for communicating with the satellite 110f using the offset based at least in part on receiving the indication, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the base station 110 (e.g., satellite 110f) may include means for updating an offset for an uplink-downlink timing interaction associated with a UE 120, means for transmitting an indication to the UE 120 that the offset is to be used based at least in part on updating the offset, and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
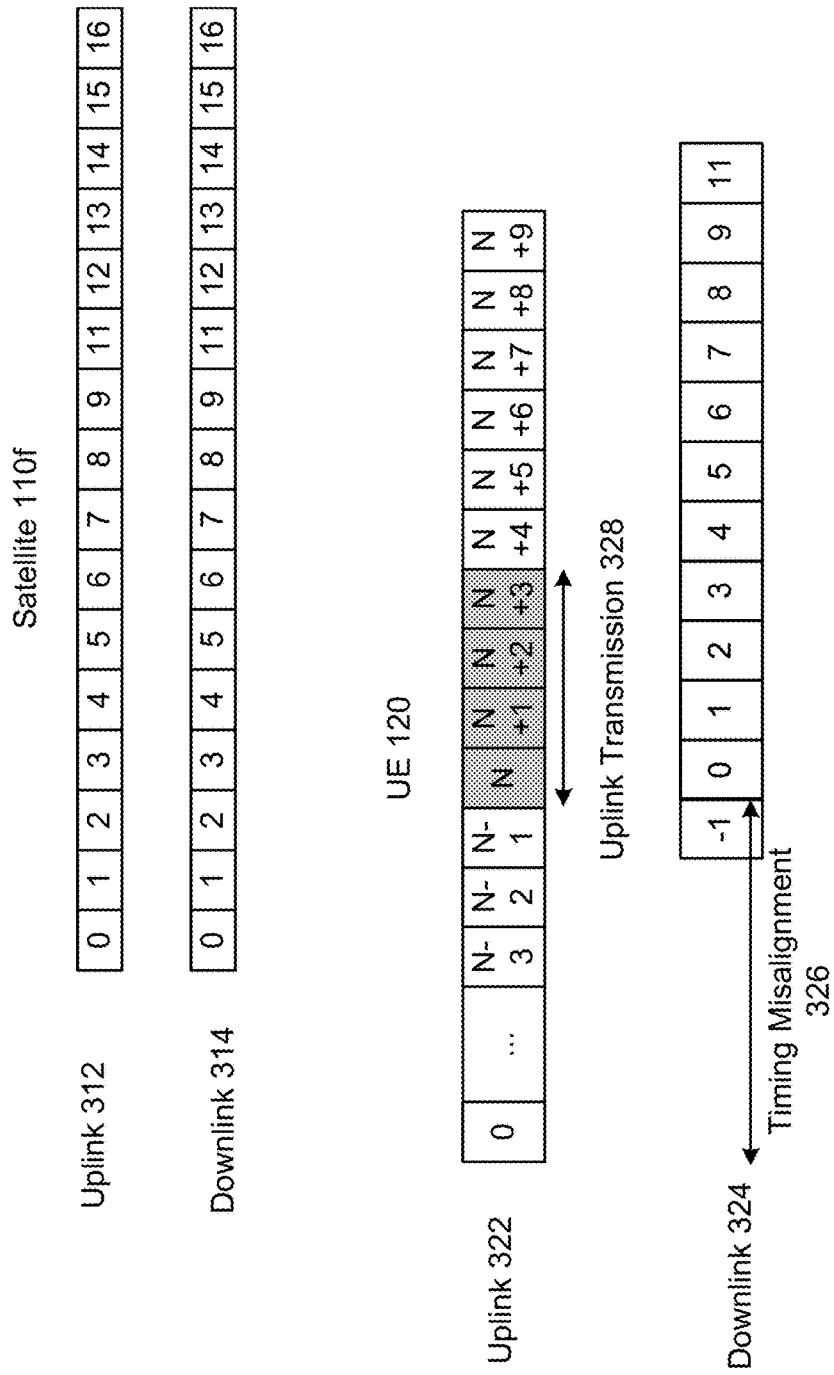
FIG. 3 is a diagram illustrating an example of timing misalignment in a non-terrestrial network, in accordance with the present disclosure.

FIG. 3 is a diagram illustrating an example 300 of timing misalignment in a non-terrestrial network, in accordance with the present disclosure. As shown in FIG. 3, a satellite 110f may be timing aligned in terms of its uplink frame and corresponding downlink frame, while a UE 120 served in a non-terrestrial cell of the satellite 110f is timing misaligned.

As shown in FIG. 3, the satellite 110f may be associated with an uplink radio frame timing 312 that includes a plurality of uplink time domain resources (e.g., slots or subframes 0-16) for uplink communication in the non-terrestrial cell, and may be associated with a downlink radio frame timing 314 that includes a plurality of downlink time domain resources (e.g., slots or subframes 0-16) for downlink communication in the non-terrestrial cell. From the perspective of the satellite 110f, the uplink radio frame timing 312 and the downlink radio frame timing 314 is timing aligned in that slot or subframe 0 of the uplink radio frame timing 312 is aligned in the time domain with slot or subframe 0 of the downlink radio frame timing 314. In other words, slot or subframe 0 of the uplink radio frame timing 312 and slot or subframe 0 of the downlink radio frame timing 314 have the same starting time.

Due to the distance between the UE 120 and the satellite 110f, a propagation delay occurs for communications between the UE 120 and the satellite 110f. As a result, from the perspective of the UE 120, an uplink radio frame timing 322 and a downlink radio frame timing 324 for the UE 120 are timing misaligned (e.g., misaligned in the time domain). In other words, as shown in FIG. 3, slot or subframe 0 of the uplink radio frame timing 322 and slot or subframe 0 of the downlink radio frame timing 324 have different starting times in the time domain.

In some aspects, the UE 120 determines a timing misalignment 326 between the uplink radio frame timing 322 and the downlink radio frame timing 324. The timing misalignment 326 may include an offset of N slots or subframes (or another quantity of time-domain resources, or another time duration, and/or the like) between slot or subframe 0 of the uplink radio frame timing 322 and slot or subframe 0 of the downlink radio frame timing 324. In these examples, the UE 120 may start an uplink transmission 328 early (e.g., based at least in part on the timing misalignment 326) to compensate for the propagation delay between the UE 120 and the satellite 110f.

Propagation distances may be relatively large between the UE 120 and the satellite 110f for non-terrestrial communication. As a result, the timing misalignment 326 may be a relatively large value on the order of several subframes or radio frames. In these examples, as explained above, the satellite 110f may signal a relatively large offset (e.g., a $K_{offset}$) to the UE 120 for communications comprising an uplink-downlink timing interaction, to compensate for the large timing misalignment 326 and to ensure valid scheduling for UE 120. An uplink-downlink interaction may refer to an association between reception of a downlink communication at the UE 120 and transmission of a corresponding uplink communication by the UE 120. For example, the satellite 110f may configure a $K_{offset}$ for the UE 120 to provide hybrid automatic repeat request (HARQ) feedback on a physical uplink control channel (PUCCH) corresponding to a physical downlink shared channel (PDSCH) communication received from the satellite 110f. In these examples, the UE 120 may use the $K_{offset}$ for determining uplink timing for the HARQ feedback (e.g., the transmission of the HARQ feedback may start from uplink slot or subframe index n+k+$K_{offset}$, where n is the last downlink subframe in which the PDSCH communication was transmitted, k is a slot offset, and $K_{offset}$ is an offset that is a function of the round-trip-time (RTT) associated with the UE 120 (or with a group of UEs) to ensure valid uplink scheduling. For example, in FIG. 3, corresponding to any downlink transmission ending in subframe or slot 0, the UE 120 cannot transmit a corresponding uplink transmission before its uplink slot N+1. For NTN, the value of the timing misalignment N in this example may be very large. The $K_{offset}$ (e.g., in the HARQ acknowledgement (ACK) timeline example above) ensures that valid scheduling is maintained even for large values of timing misalignments. In some aspects, the satellite 110f may determine the $K_{offset}$ based at least in part on the timing misalignment 326 determined by the UE 120 (e.g., if signaled to the satellite 110*f*) or may determine the $K_{offset}$ independent of the timing misalignment 326.

As indicated above, FIG. 3 is provided as an example. Other examples may differ from what is described with regard to FIG. 3.

As indicated above, the timing misalignment between an uplink radio frame timing and a downlink radio frame timing for a UE in a non-terrestrial cell may change over time. This may occur, for example, due to mobility of the UE, due to mobility of a satellite associated with the non-terrestrial cell, a combination thereof, and/or other factors. In cases where the transmission time index (e.g., slot/subframe index) for uplink transmissions triggered by a corresponding downlink transmission depends on the timing misalignment at the UE, the time indices corresponding to communications comprising such uplink-downlink interactions may also need to change over time. The change in the time indices may cause uplink communication reception issues at the satellite. For example, the satellite may expect an uplink communication to arrive at the satellite at a particular time based on an offset corresponding to the communication comprising the uplink-downlink timing interaction, where the offset is based on a timing misalignment at the UE, and where the satellite assumes a value of the offset based on a timing misalignment value that it was last aware of from the UE. If (e.g., due to a change in the UE's determination of the timing misalignment) the subsequently UE updates the offset corresponding to the communication comprising the uplink-downlink timing interaction, without agreement with or without acknowledgment from the satellite, this may cause a change in the uplink time indices corresponding to the communication comprising the uplink-downlink timing interaction, that the satellite is not aware of. If the UE transmits the uplink communication based on the updated offset (which is based on the updated timing misalignment), the uplink communication may arrive at the satellite at a time other than the expected arrival time, which may cause the uplink communication to be unreceived and/or undecodable by the satellite.

Some aspects described herein provide techniques and apparatuses for updating an uplink-downlink timing interaction offset in a non-terrestrial network. In some aspects, a UE (e.g., UE 120) may transmit an indication of an updated timing misalignment to a satellite (e.g., satellite 110*f*) in a non-terrestrial network. The satellite may update an offset (e.g., a $K_{offset}$) for an uplink-downlink timing interaction associated with the UE (e.g., based at least in part on the updated timing misalignment or independent of the updated timing misalignment). The satellite may transmit an indication to the UE to use the updated offset. In this way, the UE may wait to communicate with the satellite based at least in part on the updated offset until the UE receives an indication from the satellite that the satellite has updated the offset or has received the UE's request to update the offset (e.g., which may be the indication to use the updated offset). This enables the UE and the satellite to use the updated offset in synchronous manner, which increases the likelihood that uplink communications transmitted from the UE to the satellite are receivable and decodable by the satellite.

Figure 4A:
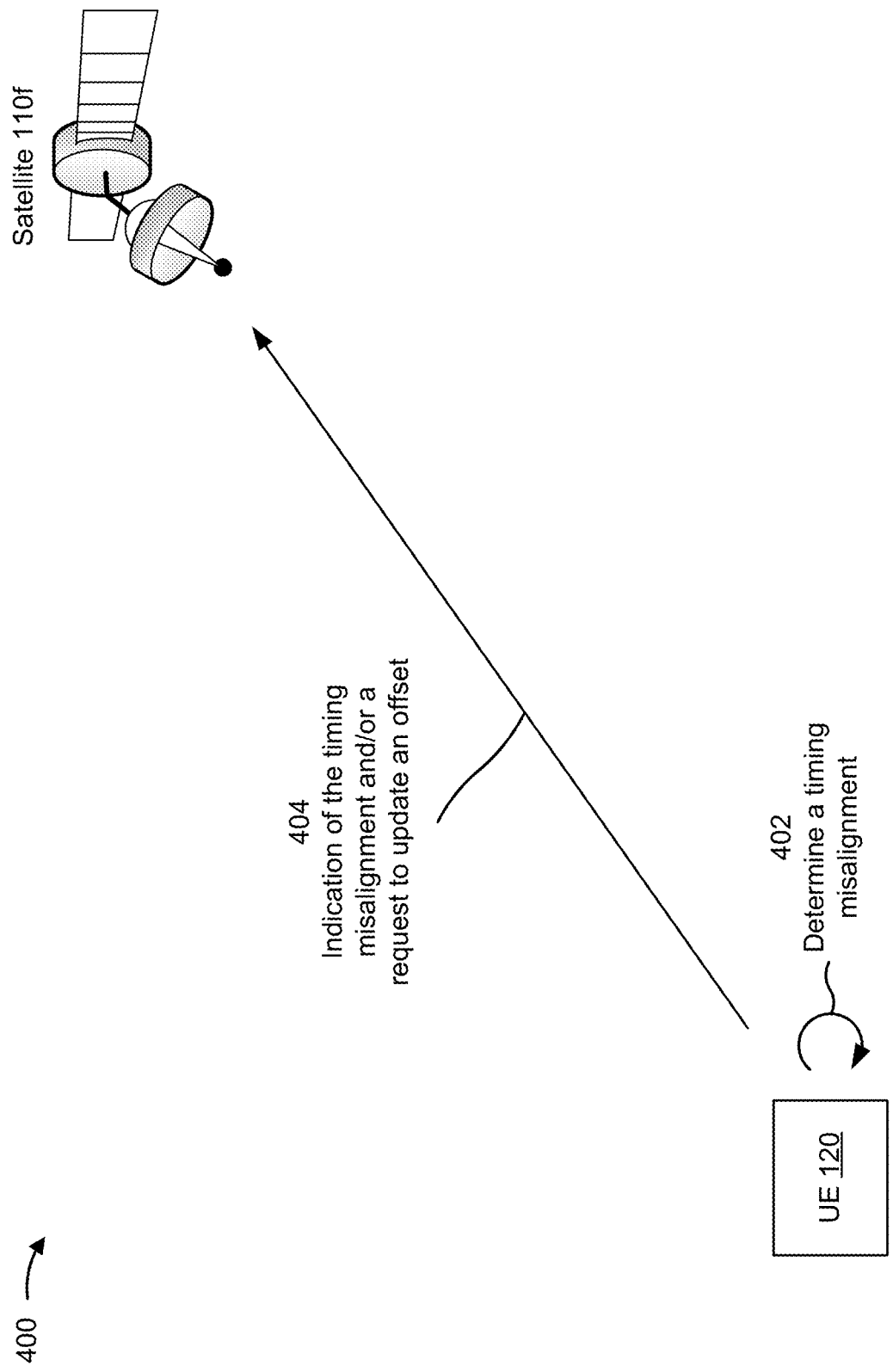
FIGS. 4A-4C are diagrams illustrating examples associated with updating an uplink-downlink timing interaction offset in a non-terrestrial network, in accordance with the present disclosure.
Figure 4B:
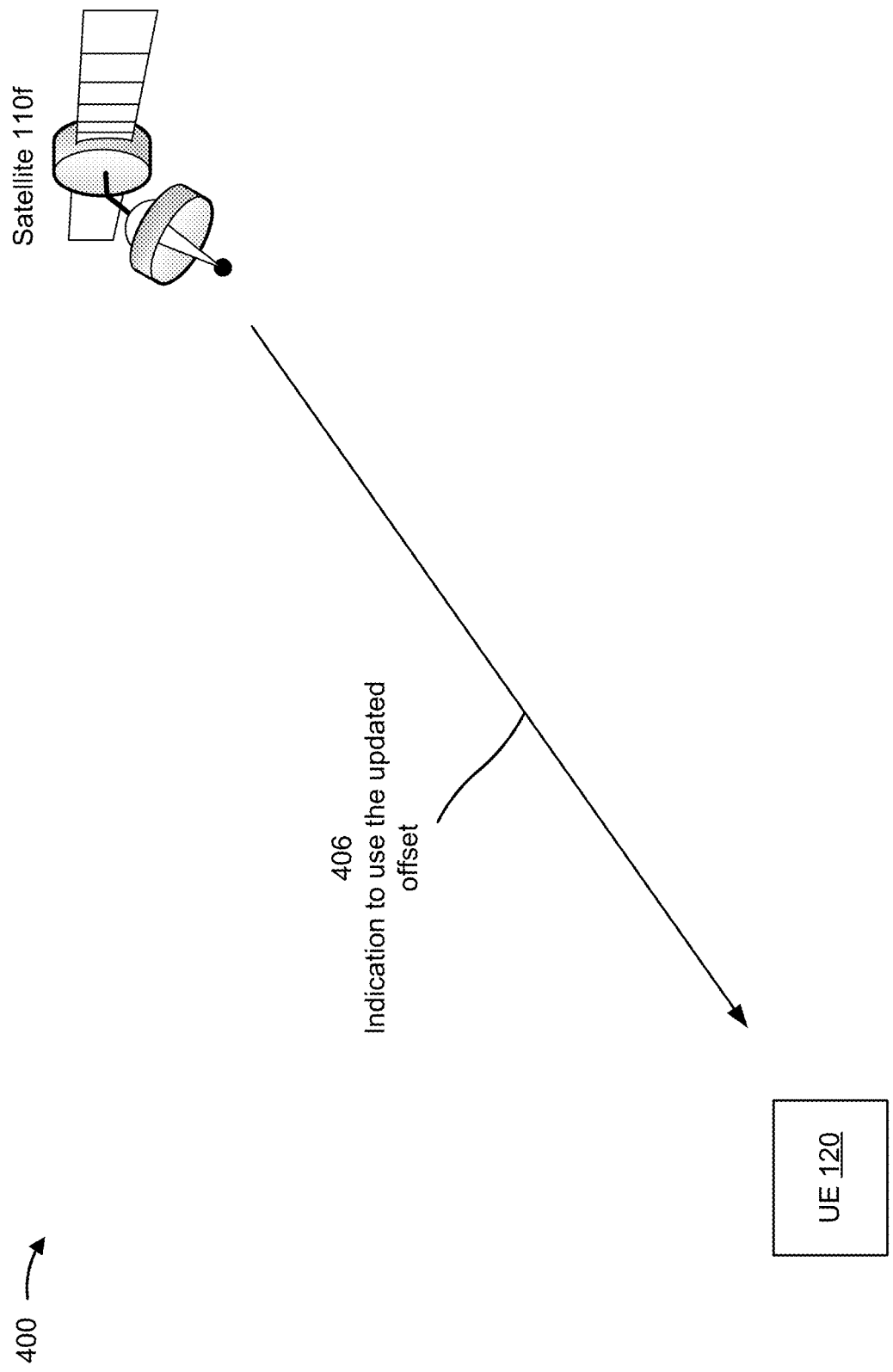
Figure 4C:
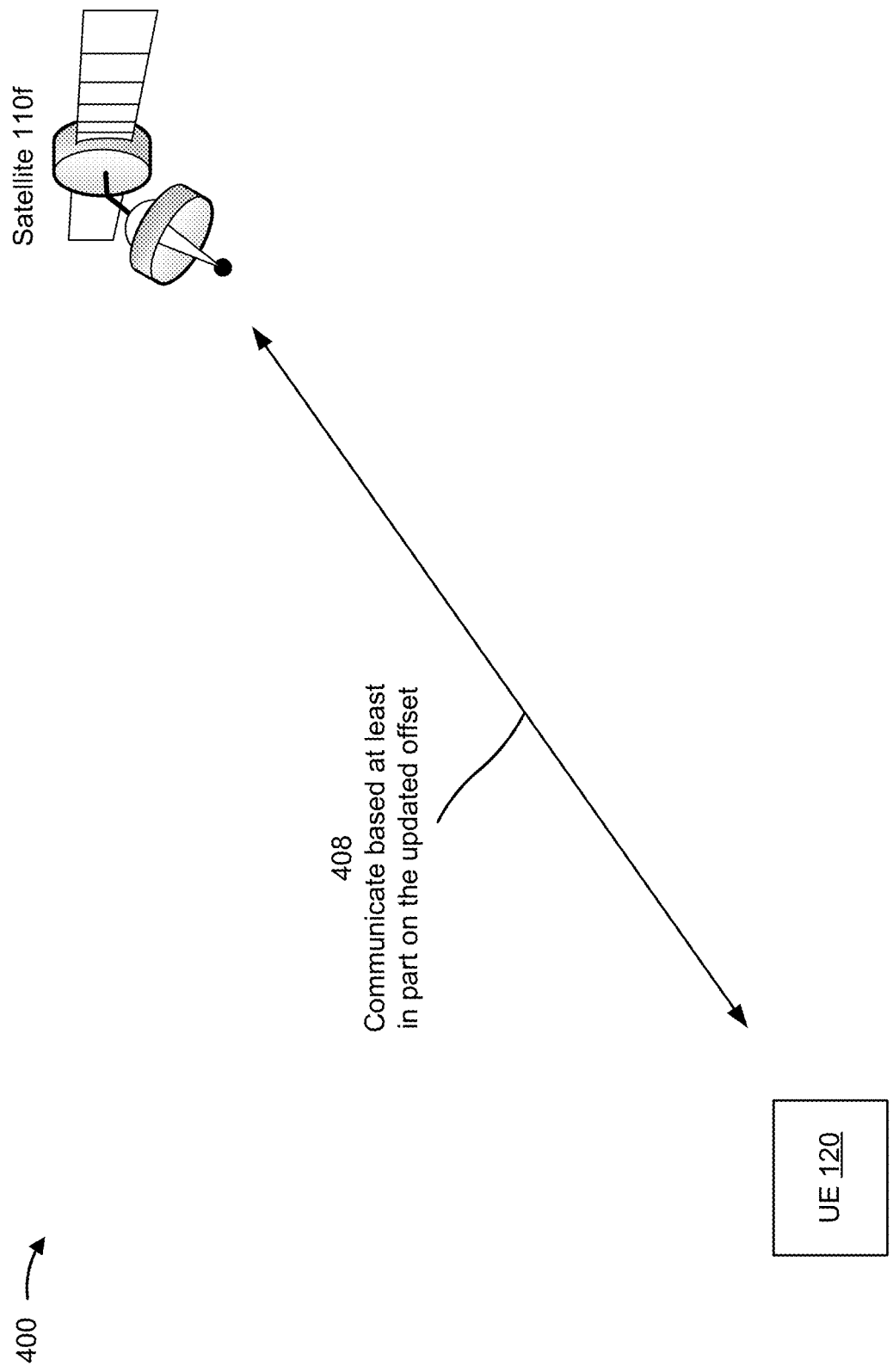

FIG. 4A-4C are diagrams illustrating one or more examples 400 associated with updating an uplink-downlink timing interaction offset in a non-terrestrial network, in accordance with the present disclosure. As shown in FIG. 4A-4C, example(s) 400 include communication between a satellite 110*f* and a UE 120. In some aspects, the satellite 110*f* and the UE 120 may be included in a non-terrestrial network, such as non-terrestrial network included in wireless network 100. The satellite 110*f* and the UE 120 may communicate on a wireless non-terrestrial access link, which may include an uplink and a downlink. Scheduling of communications on the uplink and the downlink may be based at least in part on an uplink radio frame timing (e.g., the uplink radio frame timing 312, the uplink radio frame timing 322, and/or the like) and/or a downlink radio frame timing (e.g., the downlink radio frame timing 314, the downlink radio frame timing 324, and/or the like).

Figure 7:
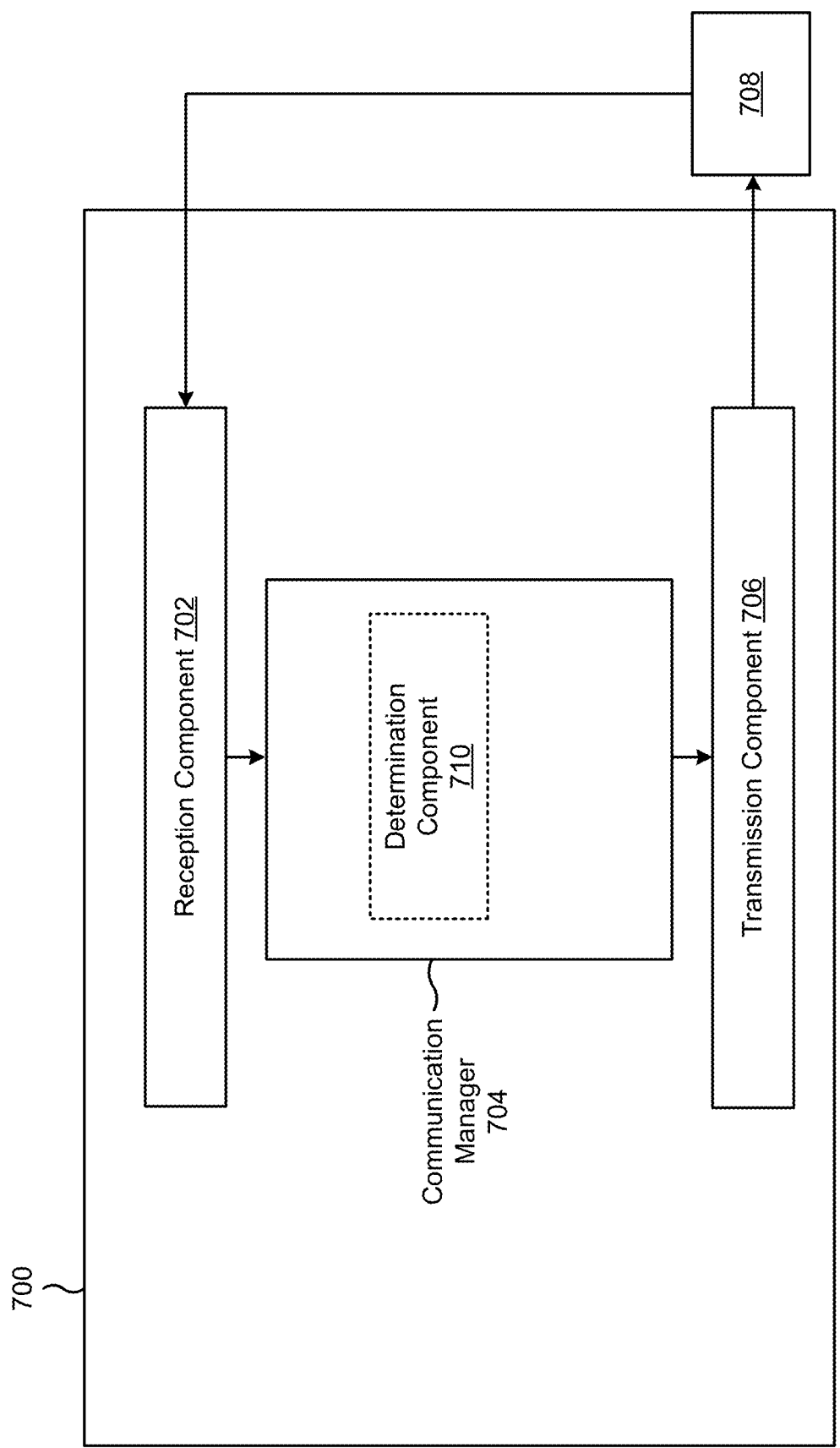
FIG. 7 is a block diagram of an example apparatus for wireless communication, in accordance with the present disclosure.

As shown in FIG. 4A, and by reference number 402, the UE 120 may determine (e.g., using receive processor 258, transmit processor 264, controller/processor 280, memory 282, determination component 710 of FIG. 7, and/or the like) a timing misalignment (e.g., a timing misalignment 326) between an uplink radio frame and a corresponding downlink radio frame associated with the UE 120. The timing misalignment may be for a non-terrestrial cell associated with the satellite 110*f*. In some aspects, the UE 120 determines the timing misalignment based at least in part on a geolocation of the UE 120 and a distance of the geolocation relative to a geolocation of the satellite 110. The timing misalignment may correspond to an RTT or propagation delay between the satellite 110*f* and the UE 120.

As further shown in FIG. 4A, and by reference number 404, the UE 120 may transmit (e.g., using controller/processor 280, transmit processor 264, TX MIMO processor 266, MOD 254, antenna 252, memory 282, transmission component 706 of FIG. 7, and/or the like), to the satellite 110*f*, an indication of the timing misalignment, an indication of a request to update an offset (e.g., a $K_{offset}$), or a combination thereof. In some aspects, the timing misalignment may be indicated as a time duration (e.g., milliseconds, seconds, and/or the like), as a time-domain resource duration (e.g., a quantity of slots, a quantity of subframes, a quantity of radio frames, and/or the like), and/or the like.

Figure 10:
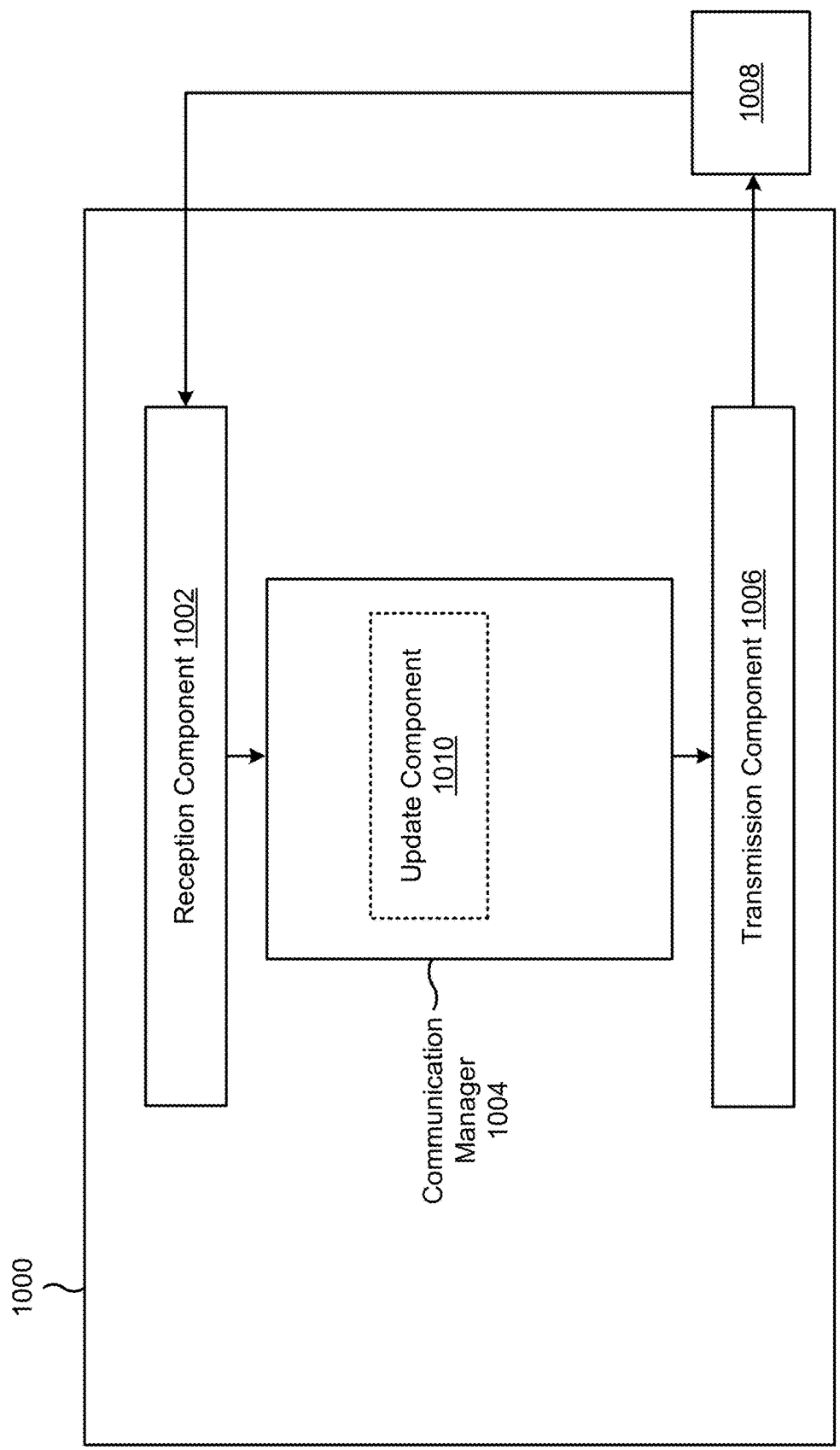
FIG. 10 is a block diagram of an example apparatus for wireless communication, in accordance with the present disclosure.

The satellite 110*f* may receive (e.g., using antenna 234, DEMOD 232, MIMO detector 236, receive processor 238, controller/processor 240, memory 242, reception component 1002 of FIG. 10, and/or the like) the indication of the timing misalignment and/or the request to update the offset. In some aspects, the UE 120 transmits the indication of the timing misalignment without an explicit request to update the offset. In these examples, the satellite 110*f* may consider the transmission of the indication of the timing misalignment as an implicit indication to update the offset (e.g., based at least in part on the timing misalignment or independently of the timing misalignment). In some aspects, the UE 120 transmits the indication of the timing misalignment with an explicit request to update the offset.

The offset may be a time-domain offset for an uplink-downlink timing interaction. For example, the offset may be a particular time duration (e.g., milliseconds, seconds, and/or the like) or a particular time-domain resource duration (e.g., a quantity of slots, a quantity of subframes, a quantity of radio frames, and/or the like) that is used for an uplink-downlink timing interaction for the UE 120 such that uplink communications transmitted by the UE 120 correspond to a valid scheduling (e.g., the uplink transmission if offset by at least a number of slots equal to the number of slots corresponding to UE 120's timing misalignment).

The types of uplink-downlink timing interactions for which the offset may be used include, for example, a transmission timing for a PUSCH scheduled by a DCI (where the offset may be used to configure the starting time location for transmission of the PUSCH, relative to the ending time location for the DCI). As another example, an offset may be used for an uplink-downlink timing interaction including a transmission timing for a PUSCH scheduled by a random access response (RAR) during a random access channel (RACH) procedure (where the offset may be used to configure the starting time location for transmission of the PUSCH relative to the ending time location for the RAR). As another example, an offset may be used for an uplink-downlink timing interaction including a transmission timing for HARQ feedback on a PUCCH (where the offset may be used to configure the starting time location for transmission of the HARQ feedback for a PDSCH communication relative to the ending time location for the PDSCH communication).

As another example, an offset may be used for an uplink-downlink timing interaction including a medium access control element (MAC-CE) action timing (where the offset may be used to configure the starting time location for an action performed by the UE 120 on the uplink relative to the ending time location of reception of the MAC-CE). As another example, an offset may be used for an uplink-downlink timing interaction including a transmission timing for channel state information (CSI) on a PUSCH (where the offset may be used to configure the starting time location for the transmission of the CSI relative to an ending time location for reception of the DCI scheduling the CSI). As another example, an offset may be used for an uplink-downlink timing interaction including a CSI reference resource timing (where the offset may be used to configure the starting time location for the resource in which the CSI report is to be transmitted relative to an ending time location for reception of the DCI configuring a CSI report). As another example, an offset may be used for an uplink-downlink timing interaction including an aperiodic sounding reference signal (SRS) transmission timing (where the offset may be used to configure the starting time location for transmission of the SRS relative to an ending time location for reception of the DCI configuring the SRS transmission).

In some aspects, the offset is a common offset that is used for all UEs in the non-terrestrial cell associated with the satellite 110f (e.g., for a particular type of uplink-downlink timing interaction or for all uplink-downlink timing interactions). In some aspects, the offset may be a UE-specific offset that is specific to the UE 120 (e.g., for a particular type of uplink-downlink timing interaction or for all uplink-downlink timing interactions).

The satellite 110f may update (e.g., using receive processor 258, transmit processor 264, controller/processor 280, memory 282, update component 1010 of FIG. 10, and/or the like) the offset. In other words, the satellite 11f may determine an updated offset. In some aspects, the satellite 110f updates the offset based at least in part on the timing misalignment (e.g., for a UE-specific offset), based at least in part on the request to update the offset, and/or the like. In some aspects, the satellite 110f updates the offset by determining an updated value (e.g., a time duration, a time-domain resource duration, and/or the like) for the offset such that the offset is updated based on mobility of the UE 120 and/or mobility of the satellite 110f.

As further shown in FIG. 4B, and by reference number 406, the satellite 110f may transmit (e.g., using controller/processor 280, transmit processor 264, TX MIMO processor 266, MOD 254, antenna 252, memory 282, transmission component 1006 of FIG. 10, and/or the like), to the UE 120, an indication that the updated offset is to be used. In some aspects, the satellite 110f transmits the indication to use the updated offset based at least in part on updating the offset so that the UE 120 and the satellite 110f communicate using the same updated offset. The UE 120 may receive (e.g., using antenna 252, DEMOD 254, MIMO detector 256, receive processor 258, controller/processor 280, memory 282, reception component 702 of FIG. 7, and/or the like) the indication to use the updated offset from the satellite 110f.

The satellite 110f may transmit the indication to use the updated offset in a downlink communication such as a DCI communication, a radio resource control (RRC) communication, a higher-layer communication such as a MAC-CE communication, and/or the like. In some aspects, the indication to use the updated offset is an explicit indication (e.g., a value in DCI field associated with the offset). In these examples, the UE 120 may monitor for the DCI and may determine (e.g., using receive processor 258, transmit processor 264, controller/processor 280, memory 282, determination component 710, and/or the like) that the updated offset is to be used based at least in part on the value in the DCI field explicitly indicating to use the updated offset.

In some aspects, the indication to use the updated offset is implicitly indicated in a downlink communication. For example, the updated timing misalignment information, or request for an updated offset may be transmitted by the UE 120 over a particular HARQ process in the uplink. In these examples, the satellite 110f may transmit (e.g., using controller/processor 240, transmit processor 220, TX MIMO processor 230, MOD 232, antenna 234, memory 242, transmission component 1006, and/or the like) a downlink communication (e.g., a DCI communication) to the UE 120 that includes a new data indicator (NDI) field associated with the uplink HARQ process over which the updated timing misalignment information, or the request for an updated offset was sent by the UE 120. The value in the NDI field may implicitly indicate to the UE 120 that the satellite correctly received the uplink transmission corresponding to the updated timing misalignment information or the request for an updated offset, and that the updated offset may be used for further communications (e.g., after a certain amount of time has elapsed). The implicit indication may be a "toggled NDI," where the value of the NDI field is flipped relative to the previous value, which indicates that the last transmission on the uplink HARQ process was successful, and that "new data" may now be sent on that uplink HARQ process.

As shown in FIG. 4C, and by reference number 408, the UE 120 (e.g., using antenna 252, DEMOD 254, MIMO detector 256, receive processor 258, transmit processor 264, TX MIMO processor 266, MOD 254, controller/processor 280, memory 282, reception component 702, transmission component 706, and/or the like) and the satellite (e.g., using controller/processor 240, transmit processor 220, TX MIMO processor 230, MOD 232, antenna 234, DEMOD 232, MIMO detector 236, receive processor 238, memory 242, reception component 1002, transmission component 1006, and/or the like) communicate based at least in part on the updated offset. For example, the satellite 110f may configure or schedule a communication comprising an uplink-downlink timing interaction for the UE 120 based at least in part on the updated offset. As another example, the UE 120 may transmit an uplink communication to the satellite 110f based at least in part on the updated offset (e.g., transmit in the uplink after a particular time duration or time-domain resource duration corresponding to the updated offset after reception of an associated downlink communication).

In some aspects, the UE 120 and the satellite 110f may apply, activate, and/or use the updated offset in a synchronous manner. For example, the satellite 110f may schedule communication with the UE 120 using the updated offset after a particular time duration or a particular time-domain resource duration from transmitting the indication to use the updated offset to the UE 120. Similarly, the UE 120 may communicate with the satellite 110f using the updated offset after a particular time duration or a particular time-domain resource duration from receiving the indication to use the updated offset from the satellite 110f. The time duration may be signaled to the UE 120 by the satellite 110f or may be configured at the UE 120 without additional signaling (e.g., may be stored in a memory 282 of the UE 120).

In some aspects, the UE 120 may assume that the satellite 110f updated the offset to correspond to a function (including, an identity function) of the timing misalignment determined by the UE 120. In these examples, the UE 120 and the satellite 110f may use the updated offset without explicit signaling of the updated offset to the UE 120. In some aspects, if the satellite 110f updates the offset to a value other than the time duration or time-domain duration of the timing misalignment, the satellite 110f may transmit (e.g., using controller/processor 280, transmit processor 264, TX MIMO processor 266, MOD 254, antenna 252, memory 282, transmission component 1006, and/or the like) an indication corresponding to the value of the updated offset to the UE 120.

In this way, the satellite 110f may update an offset (e.g., a $K_{offset}$) for an uplink-downlink timing interaction at the UE 120, and may transmit an indication to the UE 120 to use the updated offset. This enables the UE 120 and the satellite 110f to communicate using the updated offset in synchronous manner, which increases the likelihood that uplink communications transmitted from the UE 120 to the satellite are receivable and decodable by the satellite 110f.

As indicated above, FIG. 4A-4C is provided as an example. Other examples may differ from what is described with respect to FIG. 4A-4C.

Figure 5:
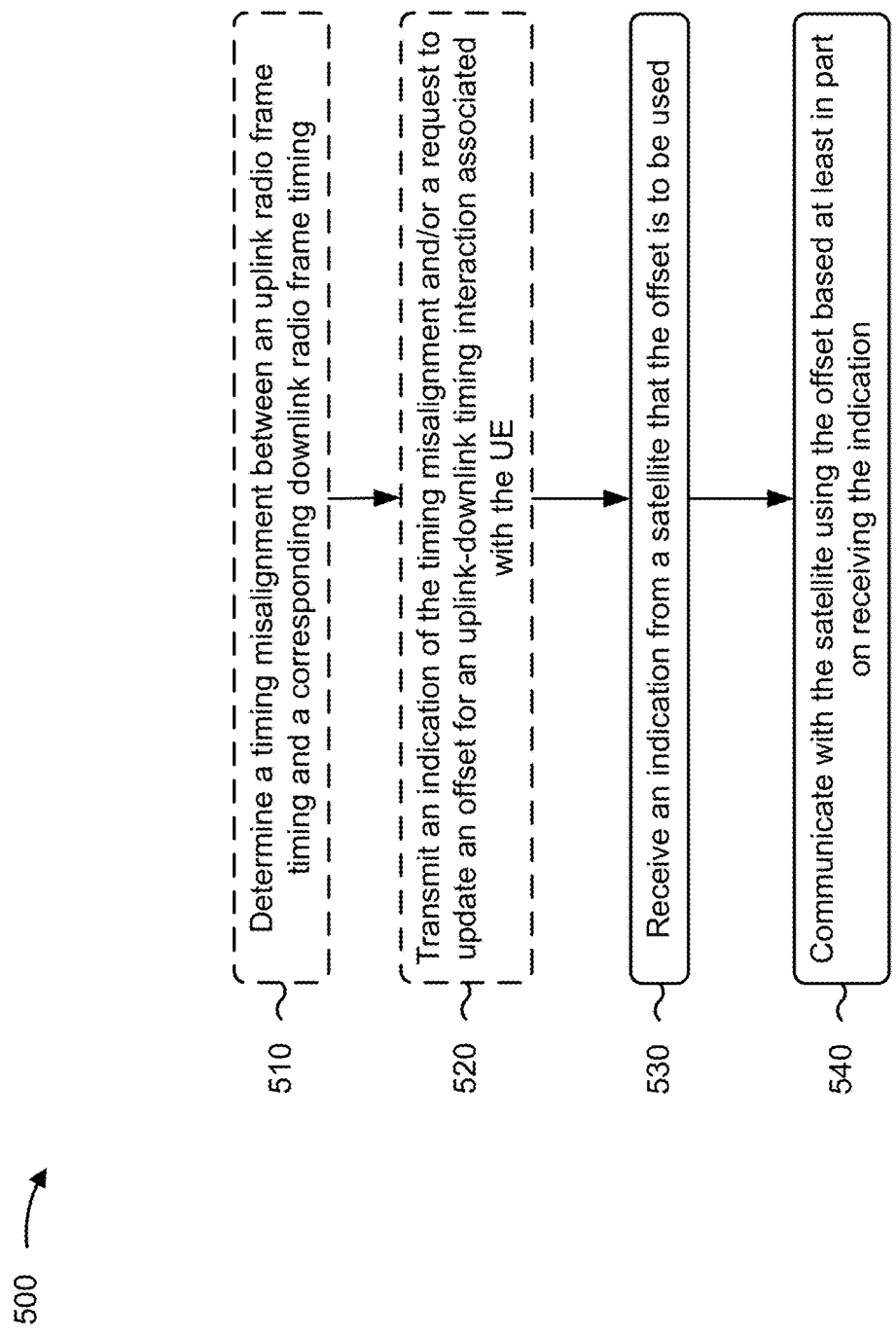
FIGS. 5 and 6 are diagrams illustrating example processes associated with updating an uplink-downlink timing interaction offset in a non-terrestrial network, in accordance with the present disclosure.

FIG. 5 is a diagram illustrating an example process 500 performed, for example, by a UE, in accordance with the present disclosure. Example process 500 is an example where the UE (e.g., UE 120) performs operations associated with updating an uplink-downlink timing interaction offset in a non-terrestrial network.

As shown in FIG. 5, in some aspects, process 500 may include determining a timing misalignment between a uplink radio frame timing and a corresponding downlink radio frame timing associated with communicating with a satellite (block 510). For example, the UE (e.g., using receive processor 258, transmit processor 264, controller/processor 280, memory 282, determination component 710, and/or the like) may determine a timing misalignment between a uplink radio frame timing and a corresponding downlink radio frame timing associated communicating with the satellite, as described above. In some aspects, determining the timing alignment includes determining at least a portion of the timing misalignment without reception of a corresponding timing advance command.

As further shown in FIG. 5, process 500 may include transmitting an indication of the timing misalignment and/or a request to update an offset (block 520). For example, the UE (e.g., using controller/processor 280, transmit processor 264, TX MIMO processor 266, MOD 254, antenna 252, memory 282, transmission component 706, and/or the like) may transmit an indication of the timing misalignment and/or a request to update an offset, as described above. The offset may be associated with an uplink-downlink timing interaction associated with the UE.

As further shown in FIG. 5, some aspects, process 500 may include receiving an indication from the satellite that the offset is to be used (block 530). For example, the UE (e.g., using antenna 234, demodulator 232, MIMO detector 236, receive processor 238, controller/processor 240, memory 242, reception component 702, and/or the like) may receive an indication from the satellite that the offset is to be used, as described above.

As further shown in FIG. 5, in some aspects, process 500 may include communicating with the satellite using the offset based at least in part on receiving the indication (block 540). For example, the UE (e.g., using antenna 252, demodulator 254, MIMO detector 256, receive processor 258, transmit processor 264, TX MIMO processor 266, modulator 254, controller/processor 280, memory 282, reception component 702, transmission component 706, and/or the like) may communicate with the satellite using the offset based at least in part on receiving the indication, as described above.

Process 500 may include additional aspects, such as any single aspect or any combination of aspects described below and/or in connection with one or more other processes described elsewhere herein.

In a first aspect, the offset is based at least in part on the timing misalignment. In a second aspect, alone or in combination with the first aspect, receiving the indication from the satellite that the offset is to be used includes receiving (e.g., using antenna 252, DEMOD 254, MIMO detector 256, receive processor 258, controller/processor 280, memory 282, reception component 702, and/or the like) the indication from the satellite that the offset is to be used based at least in part on transmitting the indication of the timing misalignment to the satellite.

In a third aspect, alone or in combination with one or more of the first and second aspects, receiving the indication from the satellite that the offset is to be used includes receiving (e.g., using antenna 252, DEMOD 254, MIMO detector 256, receive processor 258, controller/processor 280, memory 282, reception component 702, and/or the like) the indication from the satellite that the offset is to be used based at least in part on the request. In a fourth aspect, alone or in combination with one or more of the first through third aspects, receiving the indication from the satellite that the offset is to be used includes receiving (e.g., using antenna 252, DEMOD 254, MIMO detector 256, receive processor 258, controller/processor 280, memory 282, reception component 702, and/or the like) a NDI associated with a HARQ process, where a value of the NDI implicitly indicates that the offset is to be used.

In a fifth aspect, alone or in combination with one or more of the first through fourth aspects, receiving the indication from the satellite that the offset is to be used includes receiving (e.g., using antenna 252, DEMOD 254, MIMO detector 256, receive processor 258, controller/processor 280, memory 282, reception component 702, and/or the like) an explicit indication that the offset is to be used in a DCI communication, an RRC communication, or a MAC-CE communication, and process 500 includes transmitting an acknowledgement of the explicit indication to the satellite. In a sixth aspect, alone or in combination with one or more of the first through fifth aspects, communicating with the satellite using the offset includes communicating (e.g., using antenna 252, demodulator 254, MIMO detector 256, receive processor 258, transmit processor 264, TX MIMO processor 266, modulator 254, controller/processor 280, memory 282, reception component 702, transmission component 706, and/or the like) with the satellite using the offset after a particular time duration after receiving the indication.

In a seventh aspect, alone or in combination with one or more of the first through sixth aspects, the uplink-downlink timing interaction corresponds to at least one of a transmission timing for a PUSCH scheduled by DCI, a transmission timing for a PUSCH scheduled by an RAR, a transmission timing for HARQ feedback on a PUCCH, a MAC-CE action timing, a transmission timing for CSI on a PUSCH, a CSI reference resource timing, or an aperiodic SRS transmission timing. In an eighth aspect, alone or in combination with one or more of the first through seventh aspects, process 500 includes shifting the uplink time resource index for a transmission of an uplink communication relative to a triggering downlink communication by a quantity of slots and/or subframes based at least in part on the offset.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
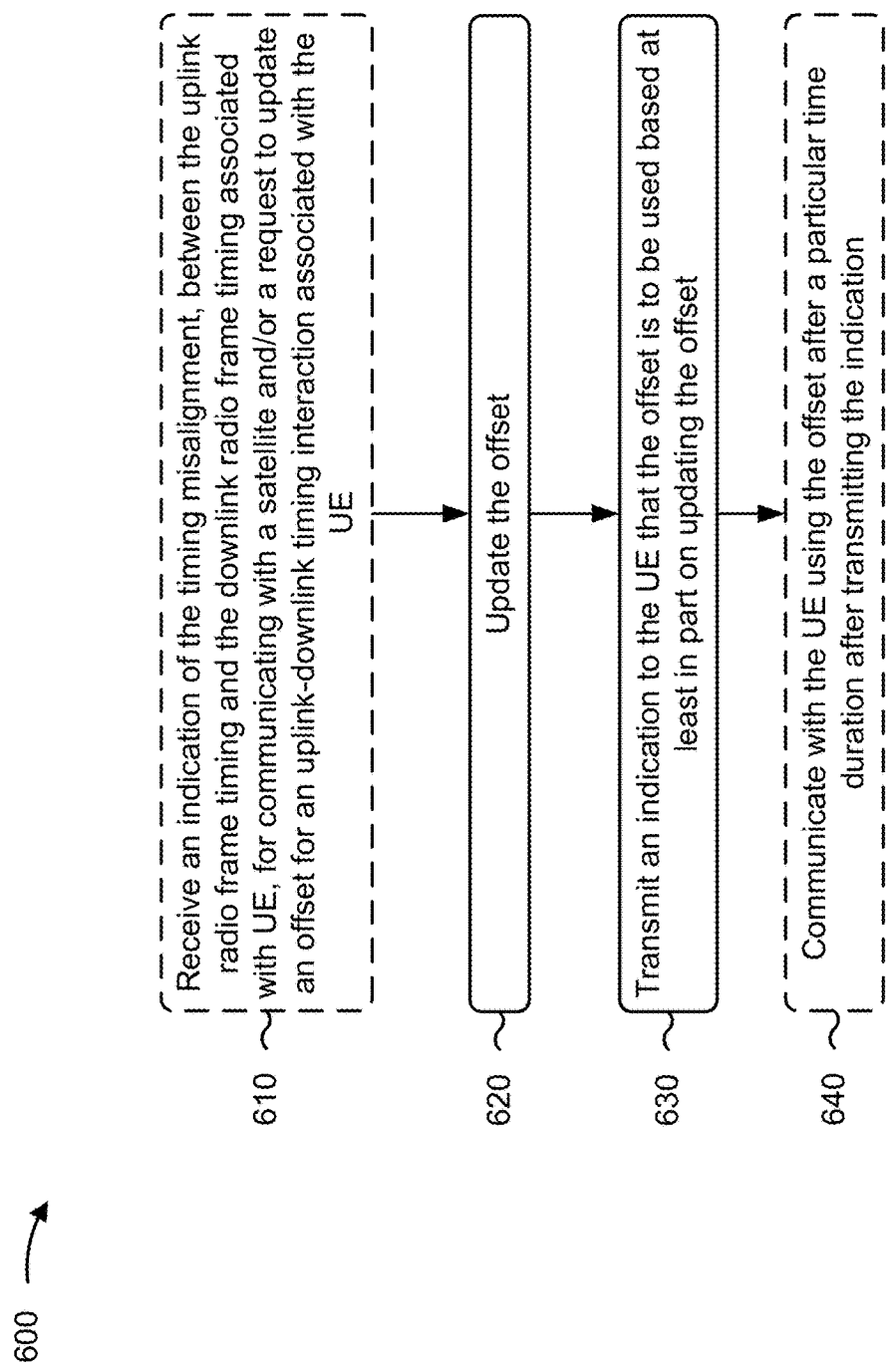

FIG. 6 is a diagram illustrating an example process 600 performed, for example, by a satellite, in accordance with the present disclosure. Example process 600 is an example where the satellite (e.g., satellite 110*f*) performs operations associated with updating an uplink-downlink timing interaction offset in a non-terrestrial network.

As shown in FIG. 6, in some aspects, process 600 may include receiving an indication of a timing misalignment, between an uplink radio frame timing and a downlink radio frame timing associated with a UE, for communicating with the satellite and/or a request to update an offset for an uplink-downlink timing interaction associated with the UE (block 610). For example, the satellite (e.g., using antenna 234, demodulator 232, MIMO detector 236, receive processor 238, controller/processor 240, memory 242, scheduler 246, reception component 1002, and/or the like) may receive an indication of a timing misalignment, between an uplink radio frame timing and a downlink radio frame timing associated with a UE, for communicating with the satellite and/or a request to update an offset for an uplink-downlink timing interaction associated with the UE, as described above.

As further shown in FIG. 6, in some aspects, process 600 may include updating the offset (block 620). For example, the satellite (e.g., using transmit processor 220, receive processor 238, controller/processor 240, memory 242, scheduler 246, update component 1010, and/or the like) may update the offset, as described above.

As further shown in FIG. 6, in some aspects, process 600 may include transmitting an indication to the UE that the offset is to be used based at least in part on updating the offset (block 630). For example, the satellite (e.g., using transmit processor 220, TX MIMO processor 230, modulator 232, antenna 234, controller/processor 240, memory 242, scheduler 246, transmission component 1006, and/or the like) may transmit an indication to the UE that the offset is to be used based at least in part on updating the offset, as described above.

As further shown in FIG. 6, in some aspects, process 600 may include communicating with the UE using the offset after a particular time duration after transmitting the indication (block 640). For example, the satellite (e.g., using antenna 234, DEMOD 232, MIMO detector 236, receive processor 238, controller/processor 240, memory 242, transmit processor 220, TX MIMO processor 230, MOD 232, scheduler 246, transmission component 1006, reception component 1002, and/or the like) may communicate with the UE using the offset after a particular time duration after transmitting the indication, as described above.

Process 600 may include additional aspects, such as any single aspect or any combination of aspects described below and/or in connection with one or more other processes described elsewhere herein.

In a first aspect, the offset is based at least in part on the timing misalignment. In a second aspect, alone or in combination with the first aspect, updating the offset includes updating (e.g., using receive processor 258, transmit processor 264, controller/processor 280, memory 282, update component 1010, and/or the like) a value for the offset based at least in part on the timing misalignment. In a third aspect, alone or in combination with one or more of the first and second aspects, transmitting the indication to the UE that offset is to be used includes transmitting (e.g., using controller/processor 240, transmit processor 220, TX MIMO processor 230, MOD 232, antenna 234, memory 242, transmission component 1006, and/or the like) the indication to the UE that the offset is to be used based at least in part on receiving the request.

In a fourth aspect, alone or in combination with one or more of the first through third aspects, transmitting the indication to the UE that the offset is to be used comprises transmitting (e.g., using controller/processor 280, transmit processor 264, TX MIMO processor 266, MOD 254, antenna 252, memory 282, transmission component 1006, and/or the like) an NDI associated with a HARQ process, where a value of the NDI implicitly indicates that the offset is to be used. In a fifth aspect, alone or in combination with one or more of the first through fourth aspects, transmitting the indication to the UE that the offset is to be used comprises transmitting an explicit indication that the offset is to be used in a downlink control information communication, a radio resource control communication, or a medium access control control element communication, and process 600 includes receiving an acknowledgement of the explicit indication from the UE.

In a sixth aspect, alone or in combination with one or more of the first through fifth aspects, the uplink-downlink timing interaction corresponds to at least one of a transmission timing for a PUSCH scheduled by DCI, a transmission timing for a PUSCH scheduled by an RAR, a transmission timing for HARQ feedback on a PUCCH, a MAC-CE action timing, a transmission timing for CSI on a PUSCH, a CSI reference resource timing, or an aperiodic SRS transmission timing.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a block diagram of an example apparatus 700 for wireless communication in accordance with the present disclosure. The apparatus 700 may be a UE 120, or a UE 120 may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as satellite 110*f* or another wireless communication device) using the reception component 702 and the transmission component 706.

In some aspects, the apparatus 700 may be configured to perform one or more operations described herein in connection with FIGS. 4A-4C. Additionally, or alternatively, the apparatus 700 may be configured to perform one or more processes described herein, such as process 500 of FIG. 5. In some aspects, the apparatus 700 may include one or more components of the UE 120 described above in connection with FIG. 2.

The reception component 702 may provide means for receiving communications, such as reference signals, control information, data communications, or a combination thereof, from the apparatus 708. The reception component 702 may provide received communications to one or more other components of the apparatus 700, such as the communication manager 704. In some aspects, the reception component 702 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include a communication manager 140, one or more antennas 252, a demodulator 254, a MIMO detector 256, a receive processor 258, a controller/processor 280, a memory 282, or a combination thereof, of the UE described above in connection with FIG. 2.

The transmission component 706 may provide means for transmitting communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may provide means for performing signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include a communication manager 140, one or more antennas 252, a modulator 254, a transmit MIMO processor 266, a transmit processor 264, a controller/processor 280, a memory 282, or a combination thereof, of the UE 120 described above in connection with FIG. 2. In some aspects, the transmission component 706 may be co-located with the reception component 702 in a transceiver.

In some aspects, the communication manager 704 may provide means for determining a timing misalignment between an uplink radio frame timing and a corresponding downlink radio frame timing. In some aspects, the communication manager 704 may provide means for transmitting an indication of the timing misalignment and/or a request to update an offset for an uplink-downlink timing interaction to the apparatus 708. In some aspects, the communication manager 704 may provide means for receiving an indication from the apparatus 708 that the offset (e.g., the updated offset) is to be used. In some aspects, the communication manager 704 may provide means for communicating with the apparatus 708 using the offset based at least in part on receiving the indication. In some aspects, the communication manager 704 may correspond to, or may include, the communication manager 140. In some aspects, the communication manager 704 may include a receive processor 258, a transmit processor 264, a controller/processor 280, a memory 282, or a combination thereof, of the UE 120 described above in connection with FIG. 2.

In some aspects, the communication manager 704 may include a set of components, such as a determination component 710. Alternatively, the set of components may be separate and distinct from the communication manager 704.

In some aspects, the communication manager 704 and/or one or more components of the set of components may include or may be implemented within hardware (e.g., one or more of the circuitry described in connection with FIG. 9). In some aspects, the communication manager 704 and/or one or more components of the set of components may include or may be implemented within a receive processor 258, a transmit processor 264, a controller/processor 280, a memory 282, or a combination thereof, of the UE 120 described above in connection with FIG. 2.

In some aspects, the communication manager 704 and/or one or more components of the set of components be implemented in code (e.g., as software or firmware stored in a memory), such as the code described in connection with FIG. 9. For example, the communication manager 704 and/or a component (or a portion of a component) may be implemented as instructions or code stored in a non-transitory computer-readable medium and executable by a controller or a processor to perform the functions or operations of the communication manager 704 and/or the component. If implemented in code, the functions of the communication manager 704 and/or a component may be executed by a receive processor 258, a transmit processor 264, a controller/processor 280, a memory 282, or a combination thereof, of the UE 120 described above in connection with FIG. 2.

In some aspects, the determination component 710 may provide means for determining the timing misalignment between the uplink radio frame timing and the corresponding downlink radio frame timing for the non-terrestrial cell associated with the apparatus 708. In some aspects, the communication manager 704 may provide means for performing one or more of the functions described above.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
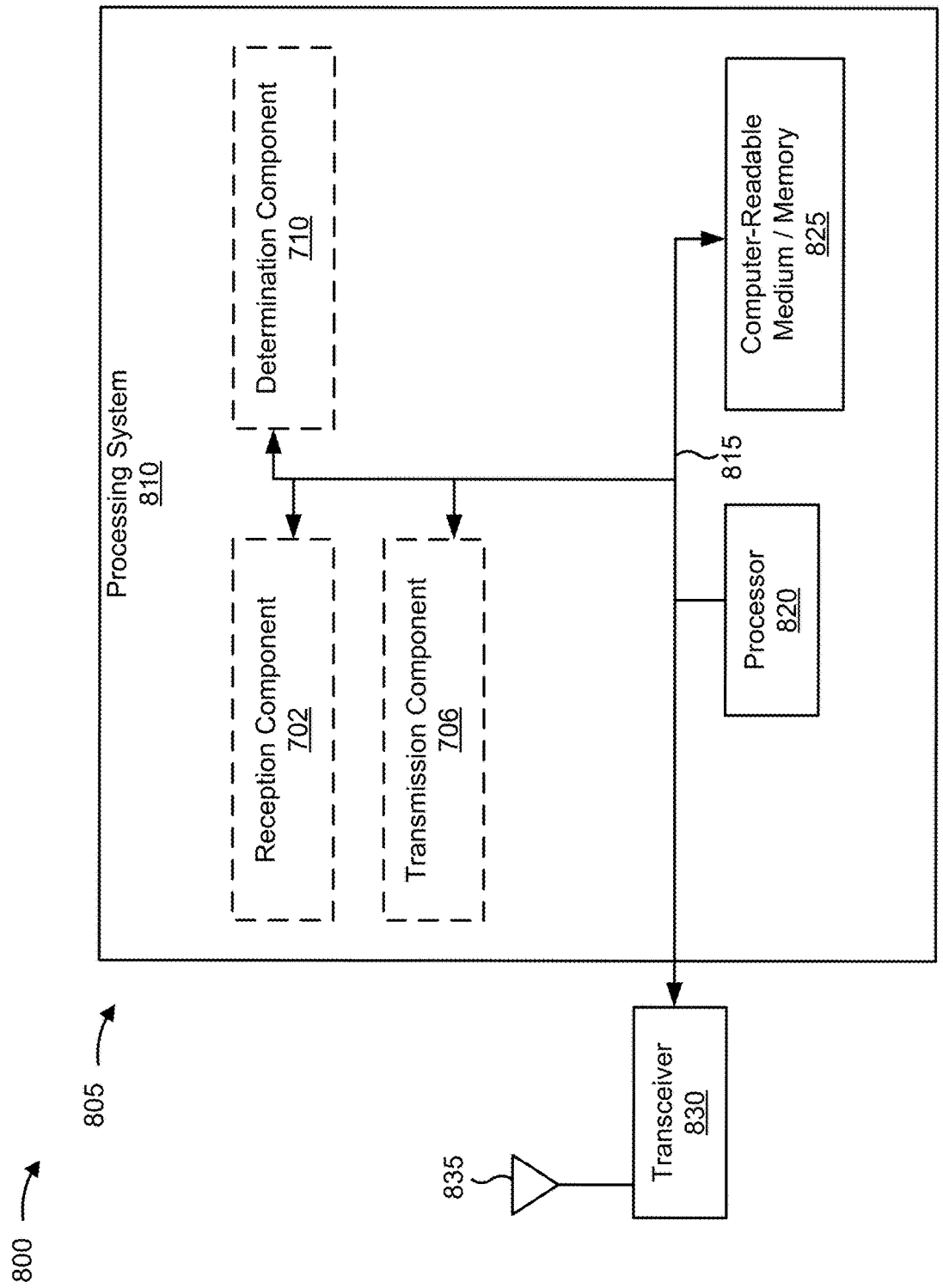
FIG. 8 is a diagram illustrating an example of a hardware implementation for an apparatus employing a processing system, in accordance with the present disclosure.

FIG. 8 is a diagram illustrating an example 800 of a hardware implementation for an apparatus 805 employing a processing system 810. The apparatus 805 may be a UE.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the illustrated components, and the computer-readable medium/memory 825. The bus 815 may also link various other circuits, such as timing sources, peripherals, voltage regulators, power management circuits, and/or the like.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 702. In addition, the transceiver 830 receives information from the processing system 810, specifically the transmission component 706, and generates a signal to be applied to the one or more antennas 835 based at least in part on the received information.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the illustrated components. The components may be software modules running in the processor 820, resident/stored in the computer-readable medium/memory 825, one or more hardware modules coupled to the processor 820, or some combination thereof.

In some aspects, the processing system 810 may be a component of the UE 120 and may include the memory 282 and/or at least one of the TX MIMO processor 266, the receive processor 258, and/or the controller/processor 280. In some aspects, the apparatus 805 for wireless communication includes means for determining a timing misalignment between an uplink radio frame timing and a corresponding downlink radio frame timing, means for transmitting an indication of the timing misalignment and/or a request to update an offset for an uplink-downlink timing interaction to the satellite, means for receiving an indication from the satellite that the offset (e.g., the updated offset) is to be used, means for communicating with the satellite using the offset based at least in part on receiving the indication, and/or the like. The aforementioned means may be one or more of the aforementioned components of the apparatus 700 and/or the processing system 810 of the apparatus 805 configured to perform the functions recited by the aforementioned means. As described elsewhere herein, the processing system 810 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 8 is provided as an example. Other examples may differ from what is described in connection with FIG. 8.

Figure 9:
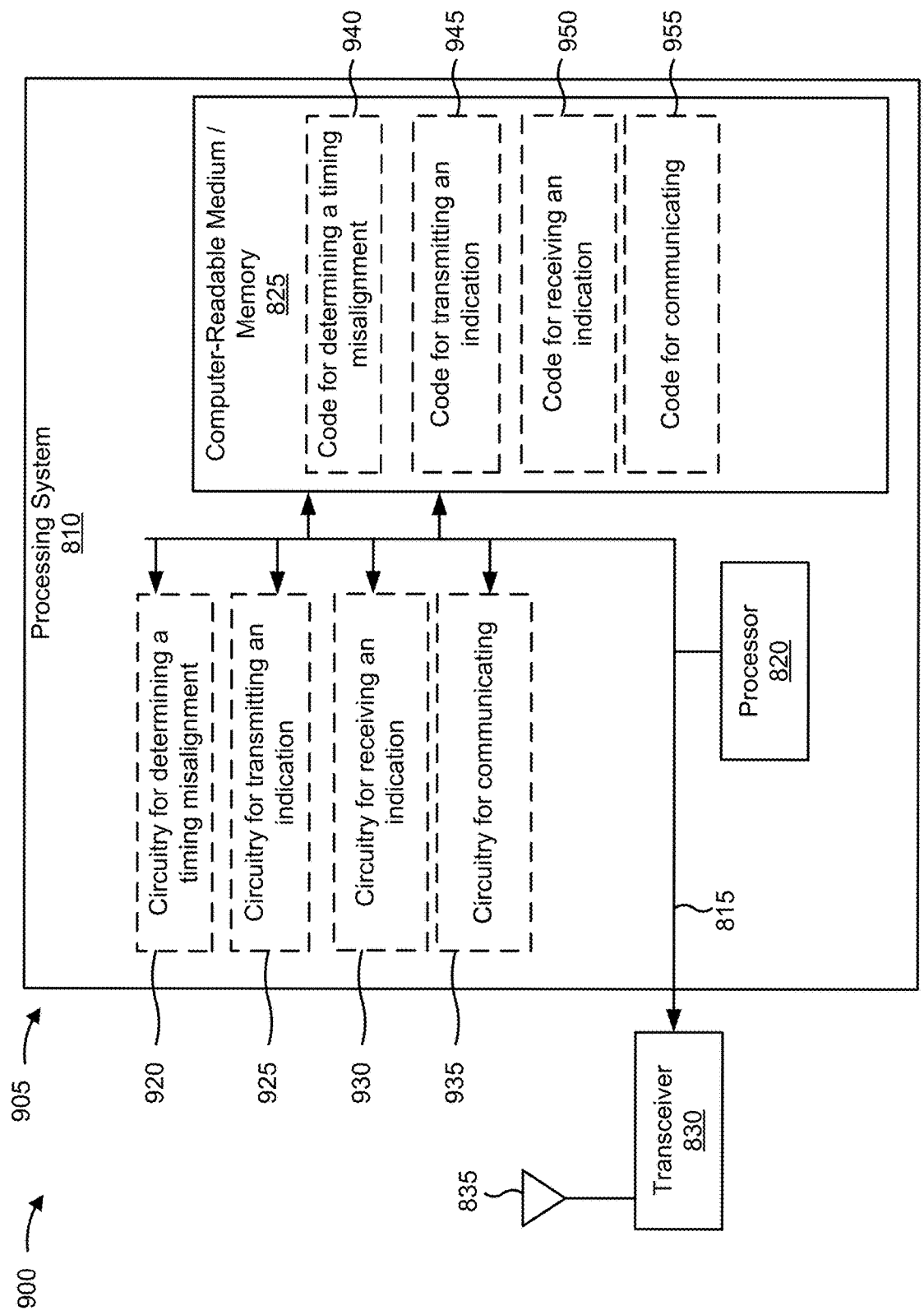
FIG. 9 is a diagram illustrating an example of an implementation of code and circuitry for an apparatus, in accordance with the present disclosure.

FIG. 9 is a diagram illustrating an example 900 of an implementation of code and circuitry for an apparatus 905. The apparatus 905 may be a UE.

As shown in FIG. 9, the apparatus 905 may include circuitry for determining a timing misalignment (circuitry 920). For example, the circuitry 920 may provide means for determining a timing misalignment between an uplink radio frame timing and a corresponding downlink radio frame timing at the apparatus 905 for communicating with a satellite.

As shown in FIG. 9, the apparatus 905 may include circuitry for transmitting an indication (circuitry 925). For example, the circuitry 925 may provide means for transmitting an indication of the timing misalignment and/or a request to update an offset for an uplink-downlink timing interaction.

As shown in FIG. 9, the apparatus 905 may include circuitry for receiving an indication (circuitry 930). For example, the circuitry 930 may provide means for receiving an indication from the satellite that the offset (e.g., the updated offset) is to be used.

As shown in FIG. 9, the apparatus 905 may include circuitry for communicating (circuitry 935). For example, the circuitry 935 may provide means for communicating with the satellite using the offset based at least in part on receiving the indication.

The circuitry 920, 925, 930, and/or 935 may include one or more components of the UE 120 described above in connection with FIG. 2, such as communication manager 140, transmit processor 264, TX MIMO processor 266, MOD 254, DEMOD 254, MIMO detector 256, receive processor 258, antenna 252, controller/processor 280, and/or memory 282.

As shown in FIG. 9, the apparatus 905 may include, stored in computer-readable medium 825, code for determining a timing misalignment (code 940). For example, the code 940, when executed by the processor 820, may cause the apparatus 905 to determine a timing misalignment between an uplink radio frame timing and a corresponding downlink radio frame timing at the apparatus 905 for communicating with a satellite.

As shown in FIG. 9, the apparatus 905 may include, stored in computer-readable medium 825, code for transmitting an indication (code 945). For example, the code 945, when executed by the processor 820, may cause the apparatus 905 to transmit an indication of the timing misalignment and/or a request to update an offset for an uplink-downlink timing interaction.

As shown in FIG. 9, the apparatus 905 may include, stored in computer-readable medium 825, code for receiving an indication (code 950). For example, the code 950, when executed by the processor 820, may cause the apparatus 905 to receive an indication from the satellite that the offset (e.g., the updated offset) is to be used.

As shown in FIG. 9, the apparatus 905 may include, stored in computer-readable medium 825, code for communicating (code 955). For example, the code 955, when executed by the processor 820, may cause the apparatus 905 to communicate with the satellite using the offset based at least in part on receiving the indication.

FIG. 9 is provided as an example. Other examples may differ from what is described in connection with FIG. 9.

FIG. 10 is a block diagram of an example apparatus 1000 for wireless communication in accordance with the present disclosure. The apparatus 1000 may be a satellite 110f, or a satellite 110f may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as UE 120 or another wireless communication device) using the reception component 1002 and the transmission component 1006.

In some aspects, the apparatus 1000 may be configured to perform one or more operations described herein in connection with FIGS. 4A-4C. Additionally, or alternatively, the apparatus 1000 may be configured to perform one or more processes described herein, such as process 600 of FIG. 6. In some aspects, the apparatus 1000 may include one or more components of the BS 110 described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include a communication manager 150, one or more antennas 234, a demodulator 232, a MIMO detector 236, a receive processor 238, a controller/processor 240, a memory 242, or a combination thereof, of the BS 110 described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include a communication manager 150, one or more antennas 234, a modulator 232, a transmit MIMO processor 230, a transmit processor 220, a controller/processor 240, a memory 242, or a combination thereof, of the BS 110 described above in connection with FIG. 2. In some aspects, the transmission component 1006 may be co-located with the reception component 1002 in a transceiver.

In some aspects, the communication manager 1004 may provide means for receiving an indication of the timing misalignment between the uplink radio frame timing and the downlink radio frame timing associated with the apparatus 1008 for a communicating with the apparatus 1000 and/or a request to update an offset for an uplink-downlink timing interaction associated with the apparatus 1008. In some aspects, the communication manager 1004 may provide means for updating the offset. In some aspects, the communication manager 1004 may provide means for transmitting an indication to the apparatus 1008 that the offset is to be used based at least in part on updating the offset. In some aspects, the communication manager 1004 may provide means for communicating with the apparatus 1008 using the offset after a particular time duration after transmitting the indication. In some aspects, the communication manager 1004 may correspond to, or may include, the communication manager 150. In some aspects, the communication manager 1004 may include a receive processor 230, a transmit processor 220, a controller/processor 240, a memory 242, or a combination thereof, of the BS 110 described above in connection with FIG. 2.

In some aspects, the communication manager 1004 may include a set of components, such as an update component 1010. Alternatively, the set of components may be separate and distinct from the communication manager 1004.

In some aspects, the communication manager 1004 and/or one or more components of the set of components may include or may be implemented within hardware (e.g., one or more of the circuitry described in connection with FIG. 12). In some aspects, the communication manager 1004 and/or one or more components of the set of components may include or may be implemented within a receive processor 230, a transmit processor 220, a controller/processor 240, a memory 242, or a combination thereof, of the BS 110 described above in connection with FIG. 2.

In some aspects, the communication manager 1004 and/or one or more components of the set of components be implemented in code (e.g., as software or firmware stored in a memory), such as the code described in connection with FIG. 12. For example, the communication manager 1004 and/or a component (or a portion of a component) may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a receive processor 238, a transmit processor 220, a controller/processor 240, a memory 242, or a combination thereof, of the BS 110 described above in connection with FIG. 2.

In some aspects, the determination component 1006 may provide means for updating the offset. In some aspects, the communication manager 1004 may provide means for performing one or more of the functions described above.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
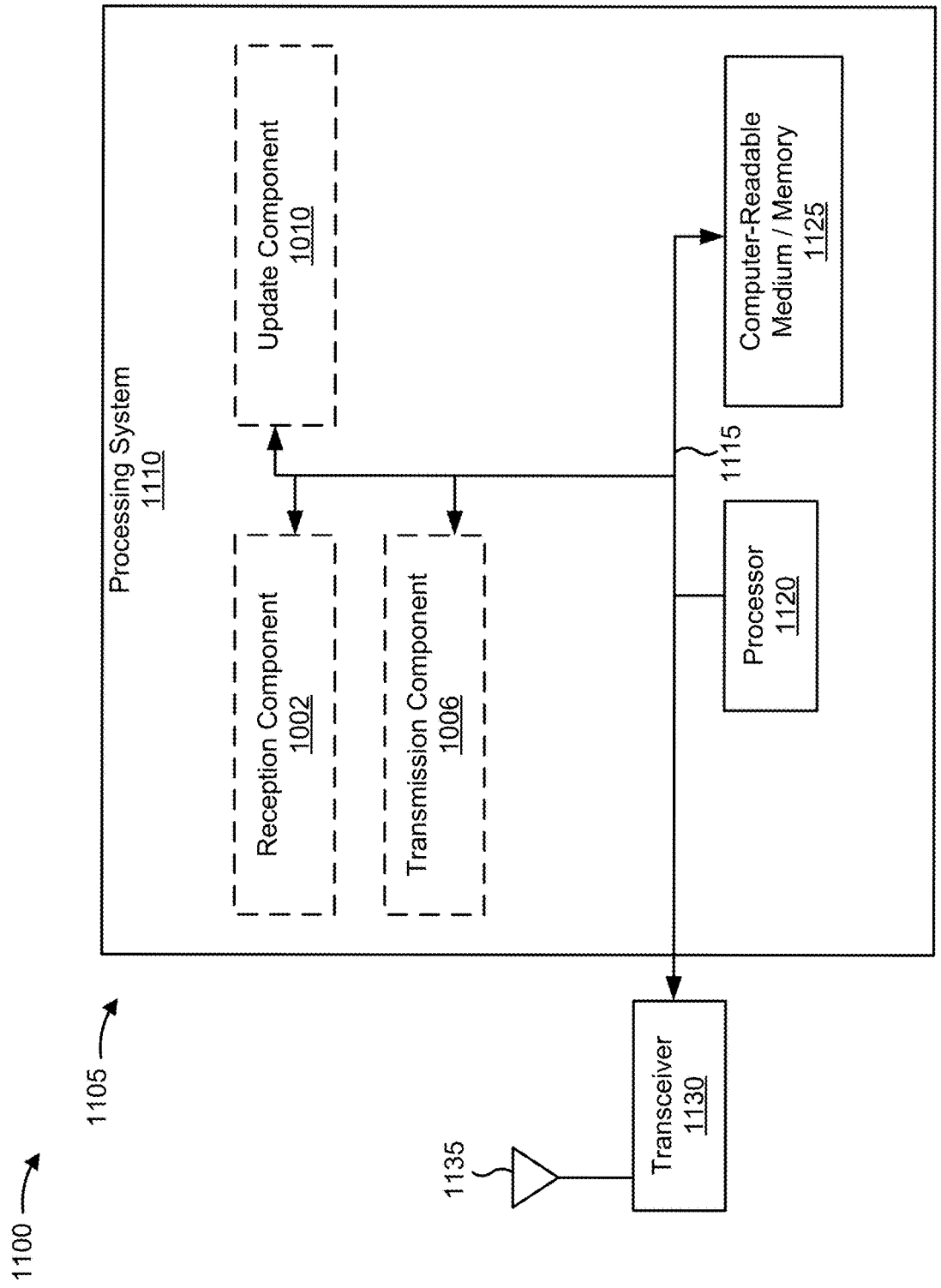
FIG. 11 is a diagram illustrating an example of a hardware implementation for an apparatus employing a processing system, in accordance with the present disclosure.

FIG. 11 is a diagram illustrating an example 1100 of a hardware implementation for an apparatus 1105 employing a processing system 1110, in accordance with the present disclosure. The apparatus 1105 may be a satellite 110f.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1006, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer-readable medium/memory 1125, one or more hardware modules coupled to the processor 1120, or some combination thereof.

In some aspects, the processing system 1110 may be a component of the BS 110 and may include the memory 242 and/or at least one of the communication manager 150, the transmit processor 220, the receive processor 238, and/or the controller/processor 240. In some aspects, the apparatus 1105 for wireless communication includes means for receiving an indication of a timing misalignment between an uplink radio frame timing and a downlink radio frame timing associated with a UE 120 for communicating with the apparatus 1100 and/or a request to update an offset for an uplink-downlink timing interaction associated with the UE 120, means for updating the offset, means for transmitting an indication to the UE 120 that the offset is to be used based at least in part on updating the offset, means for communicating with the UE 120 using the offset after a particular time duration after transmitting the indication, and/or the like. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the communication manager 150, transmit processor 220, the receive processor 238, and/or the controller/processor 240. In one configuration, the aforementioned means may be the communication manager 150, the transmit processor 220, the receive processor 238, and/or the controller/processor 240 configured to perform the functions and/or operations recited herein.

FIG. 11 is provided as an example. Other examples may differ from what is described in connection with FIG. 11.

Figure 12:
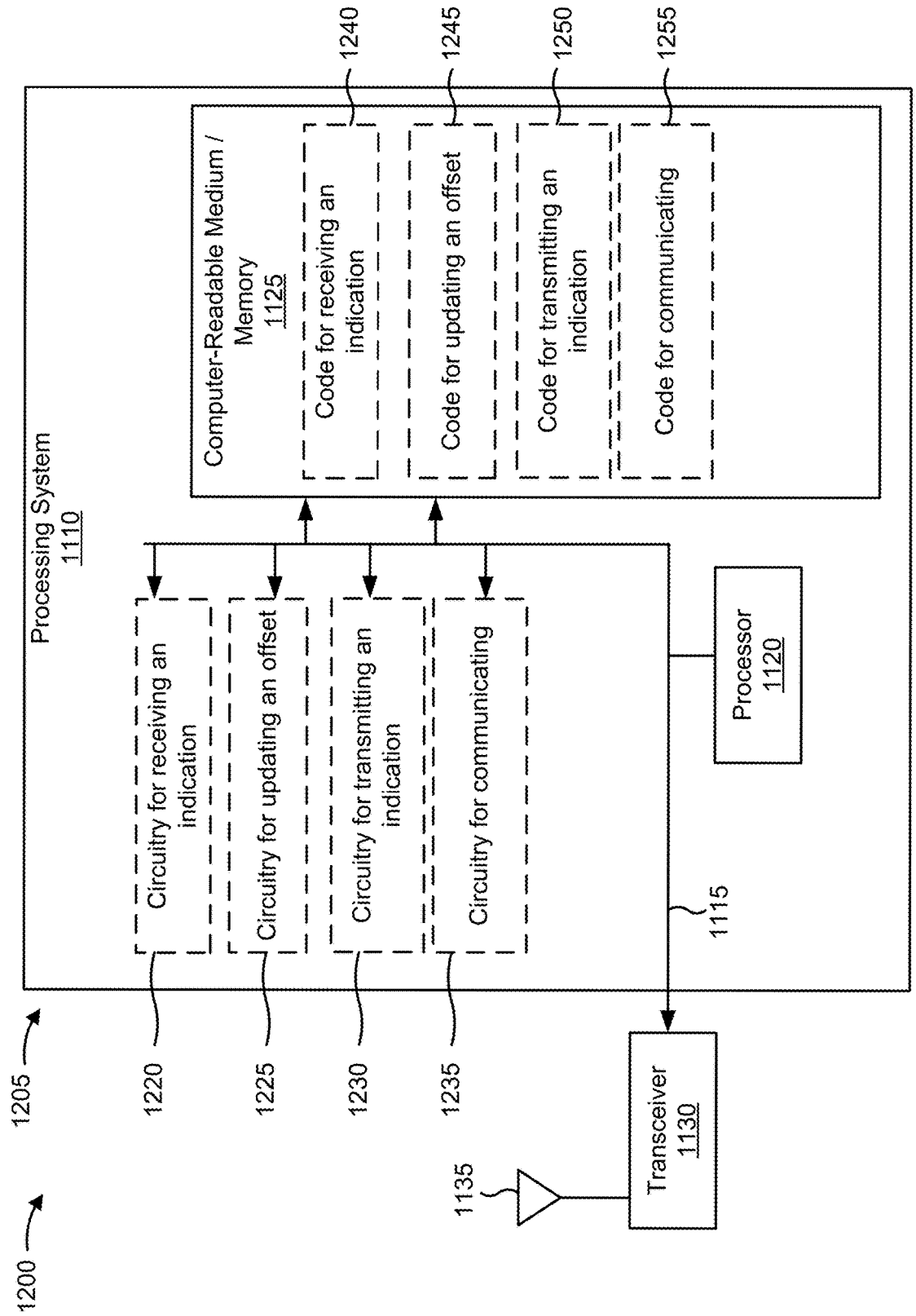
FIG. 12 is a diagram illustrating an example of an implementation of code and circuitry for an apparatus, in accordance with the present disclosure.

FIG. 12 is a diagram illustrating an example 1200 of an implementation of code and circuitry for an apparatus 1205, in accordance with the present disclosure. The apparatus 1205 may be a satellite 110f.

As shown in FIG. 12, the apparatus 1205 may include circuitry for receiving an indication (circuitry 1220). For example, the circuitry 1220 may provide means for receiving an indication of a timing misalignment between an uplink radio frame timing and a downlink radio frame timing associated with a UE 120 for communicating with the apparatus 1205 and/or a request to update an offset for an uplink-downlink timing interaction associated with the UE 120.

As shown in FIG. 12, the apparatus 1205 may include circuitry for updating an offset (circuitry 1225). For example, the circuitry 1225 may provide means for updating the offset.

As shown in FIG. 12, the apparatus 1205 may include circuitry for transmitting an indication (circuitry 1230). For example, the circuitry 1230 may provide means for means for transmitting an indication to the UE 120 that the offset is to be used based at least in part on updating the offset.

As shown in FIG. 12, the apparatus 1205 may include circuitry for communicating (circuitry 1235). For example, the circuitry 1235 may provide means for communicating with the UE 120 using the offset after a particular time duration after transmitting the indication.

The circuitry 1220, 1225, 1230, and/or 1235 may include one or more components of the BS 110 described above in connection with FIG. 2, such as communication manager 150, transmit processor 220, TX MIMO processor 230, MOD 232, DEMOD 232, MIMO detector 236, receive processor 238, antenna 234, controller/processor 240, and/or memory 242.

As shown in FIG. 12, the apparatus 1205 may include, stored in computer-readable medium 1125, code for receiving an indication (code 1240). For example, the code 1240, when executed by the processor 1120, may cause the apparatus 1205 to receive an indication of a timing misalignment between an uplink radio frame timing and a downlink radio frame timing associated with a UE 120 for communicating with the apparatus 1205 and/or a request to update an offset for an uplink-downlink timing interaction associated with the UE 120.

As shown in FIG. 12, the apparatus 1205 may include, stored in computer-readable medium 1125, code for updating an offset (code 1245). For example, the code 1245, when executed by the processor 1120, may cause the apparatus 1205 to update the offset.

As shown in FIG. 12, the apparatus 1205 may include, stored in computer-readable medium 1125, code for transmitting an indication (code 1250). For example, the code 1250, when executed by the processor 1120, may cause the apparatus 1205 to transmit an indication to the UE 120 that the offset is to be used based at least in part on updating the offset.

As shown in FIG. 12, the apparatus 1205 may include, stored in computer-readable medium 1125, code for communicating (code 1255). For example, the code 1255, when executed by the processor 1120, may cause the apparatus 1205 to communicate with the UE 120 using the offset after a particular time duration after transmitting the indication.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: receiving an indication from a satellite that an offset associated with an uplink-downlink timing interaction is to be used; and communicating with the satellite using the offset based at least in part on receiving the indication.

Aspect 2: The method of Aspect 1, wherein the offset is based at least in part on a timing misalignment, between an uplink radio frame timing and a corresponding downlink radio frame timing at the UE, associated with communicating with the satellite. Aspect 3: The method of Aspect 2, further comprising: determining at least a portion of the timing misalignment without reception of a corresponding timing advance command; transmitting an indication of the timing misalignment to the satellite; and wherein receiving the indication from the satellite that the offset is to be used comprises: receiving the indication from the satellite that the offset is to be used based at least in part on transmitting the indication of the timing misalignment to the satellite, wherein receiving the indication from the satellite that the offset is to be used comprises: receiving the indication from the satellite that the offset is to be used based at least in part on transmitting the indication of the timing misalignment to the satellite.

Aspect 4: The method of any of Aspects 1-3, further comprising: transmitting a request to the satellite to update the offset; and wherein receiving the indication from the satellite that the offset is to be used comprises: receiving the indication from the satellite that the offset is to be used based at least in part on the request, wherein receiving the indication from the satellite that the offset is to be used comprises: receiving the indication from the satellite that the offset is to be used based at least in part on the request. Aspect 5: The method of any of Aspects 1-4, wherein receiving the indication from the satellite that the offset is to be used comprises: receiving a new data indicator (NDI) associated with a hybrid automatic repeat request process, wherein a value of the NDI implicitly indicates that the offset is to be used.

Aspect 6: The method of any of Aspects 1-5, wherein receiving the indication from the satellite that the offset is to be used comprises: receiving an explicit indication that the offset is to be used in: a downlink control information communication, a radio resource control communication, or a medium access control control element communication. Aspect 7: The method of Aspect 6, further comprising: transmitting an acknowledgement of the explicit indication to the satellite. Aspect 8: The method of any of Aspects 1-7, wherein communicating with the satellite using the offset comprises: communicating with the satellite using the offset after a particular time duration after receiving the indication.

Aspect 9: The method of any of Aspects 1-8, wherein the uplink-downlink timing interaction corresponds to at least one of: a transmission timing for a physical uplink shared channel (PUSCH) scheduled by downlink control information, a transmission timing for a PUSCH scheduled by a random access response, a transmission timing for hybrid automatic repeat request (HARQ) feedback, a medium access control element action timing, a transmission timing for channel state information (CSI) on a PUSCH, a CSI reference resource timing, or an aperiodic sounding reference signal transmission timing. Aspect 10: The method of any of Aspects 1-9, wherein communicating with the satellite using the offset comprises: shifting an uplink time resource index for a transmission of an uplink communication relative to a triggering downlink communication by a quantity of slots and/or subframes based at least in part on the offset.

Aspect 11: A method of wireless communication performed by a satellite, comprising: updating an offset for an uplink-downlink timing interaction associated with a user equipment (UE); and transmitting an indication to the UE that the offset is to be used based at least in part on updating the offset.

Aspect 12: The method of Aspect 11, wherein the offset is based at least in part on a timing misalignment, between an uplink radio frame timing and a corresponding downlink radio frame timing at the UE, associated with communicating with the satellite. Aspect 13: The method of Aspect 12, further comprising: receiving an indication of the timing misalignment; and wherein updating the offset comprises: determining an updated value for the offset based at least in part on the timing misalignment, wherein updating the offset comprises: determining an updated value for the offset based at least in part on the timing misalignment.

Aspect 14: The method of any of Aspects 11-13, further comprising: receiving a request from the UE to update the offset; and wherein transmitting the indication to the UE that offset is to be used comprises: transmitting the indication to the UE that the offset is to be used based at least in part on receiving the request, wherein transmitting the indication to the UE that offset is to be used comprises: transmitting the indication to the UE that the offset is to be used based at least in part on receiving the request. Aspect 15: The method of any of Aspects 11-14, wherein transmitting the indication to the UE that the offset is to be used comprises: transmitting a new data indicator (NDI) associated with a hybrid automatic repeat request process, wherein a value of the NDI implicitly indicates that the offset is to be used.

Aspect 16: The method of any of Aspects 11-15, wherein transmitting the indication to the UE that the offset is to be used comprises: transmitting an explicit indication that the offset is to be used in: a downlink control information communication, a radio resource control communication, or a medium access control control element communication. Aspect 17: The method of Aspect 16, further comprising: receiving an acknowledgement of the explicit indication from the UE.

Aspect 18: The method of any of Aspects 11-17, further comprising: communicating with the UE using the offset after a particular time duration after transmitting the indication. Aspect 19: The method of any of Aspects 11-18, wherein the uplink-downlink timing interaction corresponds to at least one of: a transmission timing for a physical uplink shared channel (PUSCH) scheduled by downlink control information, a transmission timing for a PUSCH scheduled by a random access response, a transmission timing for hybrid automatic repeat request (HARQ) feedback, a medium access control element action timing, a transmission timing for channel state information (CSI) on a PUSCH, a CSI reference resource timing, or an aperiodic sounding reference signal transmission timing.

Aspect 20: A method of wireless communication performed by a user equipment (UE), comprising: receiving an indication from a base station that an offset associated with an uplink-downlink timing interaction is to be used; and communicating with the base station using the offset based at least in part on receiving the indication.

Aspect 21: A method of wireless communication performed by a base station, comprising: updating an offset for an uplink-downlink timing interaction associated with a user equipment (UE); and transmitting an indication to the UE that the offset is to be used based at least in part on updating the offset.

Aspect 22: An apparatus for wireless communication at a device, comprising a processor; memory coupled with the processor; and instructions stored in the memory and executable by the processor to cause the apparatus to perform the method of one or more of Aspects 1-10. Aspect 23: A device for wireless communication, comprising a memory and one or more processors coupled to the memory, the one or more processors configured to perform the method of one or more of Aspects 1-10. Aspect 24: An apparatus for wireless communication, comprising at least one means for performing the method of one or more of Aspects 1-10. Aspect 25: A non-transitory computer-readable medium storing code for wireless communication, the code comprising instructions executable by a processor to perform the method of one or more of Aspects 1-10. Aspect 26: A non-transitory computer-readable medium storing a set of instructions for wireless communication, the set of instructions comprising one or more instructions that, when executed by one or more processors of a device, cause the device to perform the method of one or more of Aspects 1-10.

Aspect 27: An apparatus for wireless communication at a device, comprising a processor; memory coupled with the processor; and instructions stored in the memory and executable by the processor to cause the apparatus to perform the method of one or more of Aspects 11-19. Aspect 28: A device for wireless communication, comprising a memory and one or more processors coupled to the memory, the one or more processors configured to perform the method of one or more of Aspects 11-19. Aspect 29: An apparatus for wireless communication, comprising at least one means for performing the method of one or more of Aspects 11-19. Aspect 30: A non-transitory computer-readable medium storing code for wireless communication, the code comprising instructions executable by a processor to perform the method of one or more of Aspects 11-19. Aspect 31: A non-transitory computer-readable medium storing a set of instructions for wireless communication, the set of instructions comprising one or more instructions that, when executed by one or more processors of a device, cause the device to perform the method of one or more of Aspects 11-19.

Aspect 32: An apparatus for wireless communication at a device, comprising a processor; memory coupled with the processor; and instructions stored in the memory and executable by the processor to cause the apparatus to perform the method of Aspect 20. Aspect 33: A device for wireless communication, comprising a memory and one or more processors coupled to the memory, the one or more processors configured to perform the method of Aspect 20. Aspect 34: An apparatus for wireless communication, comprising at least one means for performing the method of Aspect 20.

Aspect 35: A non-transitory computer-readable medium storing code for wireless communication, the code comprising instructions executable by a processor to perform the method of Aspect 20. Aspect 36: A non-transitory computer-readable medium storing a set of instructions for wireless communication, the set of instructions comprising one or more instructions that, when executed by one or more processors of a device, cause the device to perform the method of Aspect 20.

Aspect 37: An apparatus for wireless communication at a device, comprising a processor; memory coupled with the processor; and instructions stored in the memory and executable by the processor to cause the apparatus to perform the method of Aspect 21. Aspect 38: A device for wireless communication, comprising a memory and one or more processors coupled to the memory, the one or more processors configured to perform the method of Aspect 21. Aspect 39: An apparatus for wireless communication, comprising at least one means for performing the method of Aspect 21. Aspect 40: A non-transitory computer-readable medium storing code for wireless communication, the code comprising instructions executable by a processor to perform the method of Aspect 21. Aspect 41: A non-transitory computer-readable medium storing a set of instructions for wireless communication, the set of instructions comprising one or more instructions that, when executed by one or more processors of a device, cause the device to perform the method of Aspect 21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
   receive an indication from a satellite of an offset associated with an uplink-downlink timing interaction and a new data indicator (NDI) associated with a hybrid automatic repeat request process, wherein a value of the NDI implicitly indicates that the offset is to be used; and communicate with the satellite using the offset based at least in part on receiving the indication.

2. The UE of claim 1, wherein the offset is based at least in part on a timing misalignment, between an uplink radio frame timing and a corresponding downlink radio frame timing at the UE, associated with communicating with the satellite;
wherein the one or more processors are further configured to:
determine at least a portion of the timing misalignment without reception of a corresponding timing advance command; and
transmit an indication of the timing misalignment to the satellite; and
wherein the one or more processors, to receive the indication from the satellite that the offset is to be used, are configured to:
receive the indication from the satellite that the offset is to be used based at least in part on transmitting the indication of the timing misalignment to the satellite.

3. The UE of claim 1, wherein the one or more processors are further configured to:
transmit a request to the satellite to update the offset; and
wherein the one or more processors, when receiving the indication from the satellite that the offset is to be used, are configured to:
receive the indication from the satellite that the offset is to be used based at least in part on the request.

4. The UE of claim 1, wherein the one or more processors, when receiving the indication from the satellite that the offset is to be used, are configured to:
receive an explicit indication that the offset is to be used in:
a downlink control information communication,
a radio resource control communication, or
a medium access control control element communication; and
wherein the one or more processors are further configured to:
transmit an acknowledgement of the explicit indication to the satellite.

5. The UE of claim 1, wherein the one or more processors, when communicating with the satellite using the offset, are configured to:
communicate with the satellite using the offset after a particular time duration after receiving the indication.

6. The UE of claim 1, wherein the uplink-downlink timing interaction corresponds to at least one of:
a transmission timing for a physical uplink shared channel (PUSCH) scheduled by downlink control information,
a transmission timing for a PUSCH scheduled by a random access response,
a transmission timing for hybrid automatic repeat request (HARQ) feedback,
a medium access control control element action timing,
a transmission timing for channel state information (CSI) on a PUSCH,
a CSI reference resource timing, or
an aperiodic sounding reference signal transmission timing.

7. The UE of claim 1, wherein the one or more processors, when communicating with the satellite using the offset, are configured to:
shift an uplink time resource index for a transmission of an uplink communication relative to a triggering downlink communication by a quantity of slots and/or subframes based at least in part on the offset.

8. A satellite for wireless communication, comprising:
a memory; and
one or more processors coupled to the memory, the one or more processors configured to:
receive an indication of a timing misalignment between an uplink radio frame timing and a corresponding downlink radio frame timing at a user equipment (UE), associated with communicating with the satellite;
determine an updated value for an offset based at least in part on the timing misalignment;
update the offset based on the updated value associated with an uplink-downlink timing interaction associated with the UE; and
transmit an indication to the UE that the offset is to be used based at least in part on updating the offset.

9. The satellite of claim 8, wherein the one or more processors are further configured to:
receive a request from the UE to update the offset; and
wherein the one or more processors, when transmitting the indication to the UE that offset is to be used, are configured to:
transmit the indication to the UE that the offset is to be used based at least in part on receiving the request.

10. A method of wireless communication performed by a user equipment (UE), comprising:
receiving an indication from a satellite of an offset associated with an uplink-downlink timing interaction and a new data indicator (NDI) associated with a hybrid automatic repeat request process, wherein a value of the NDI implicitly indicates that the offset is to be used; and
communicating with the satellite using the offset based at least in part on receiving the indication.

11. The method of claim 10, wherein the offset is based at least in part on a timing misalignment, between an uplink radio frame timing and a corresponding downlink radio frame timing at the UE, associated with communicating with the satellite.

12. The method of claim 11, further comprising:
determining at least a portion of the timing misalignment without reception of a corresponding timing advance command;
transmitting an indication of the timing misalignment to the satellite; and
wherein receiving the indication from the satellite that the offset is to be used comprises:
receiving the indication from the satellite that the offset is to be used based at least in part on transmitting the indication of the timing misalignment to the satellite.

13. The method of claim 10, further comprising:
transmitting a request to the satellite to update the offset; and
wherein receiving the indication from the satellite that the offset is to be used comprises:
receiving the indication from the satellite that the offset is to be used based at least in part on the request.

14. The method of claim 10, wherein receiving the indication from the satellite that the offset is to be used comprises:
receiving an explicit indication that the offset is to be used in:
a downlink control information communication,
a radio resource control communication, or
a medium access control control element communication.

15. The method of claim 14, further comprising:
transmitting an acknowledgement of the explicit indication to the satellite.

16. The method of claim 10, wherein communicating with the satellite using the offset comprises:
communicating with the satellite using the offset after a particular time duration after receiving the indication.

17. The method of claim 10, wherein the uplink-downlink timing interaction corresponds to at least one of:
a transmission timing for a physical uplink shared channel (PUSCH) scheduled by downlink control information,
a transmission timing for a PUSCH scheduled by a random access response,
a transmission timing for hybrid automatic repeat request (HARQ) feedback,
a medium access control control element action timing,
a transmission timing for channel state information (CSI) on a PUSCH,
a CSI reference resource timing, or
an aperiodic sounding reference signal transmission timing.

18. The method of claim 10, wherein communicating with the satellite using the offset comprises:
shifting an uplink time resource index for a transmission of an uplink communication relative to a triggering downlink communication by a quantity of slots and/or subframes based at least in part on the offset.

19. A method of wireless communication performed by a satellite, comprising:
receiving an indication of a timing misalignment between an uplink radio frame timing and a corresponding downlink radio frame timing at a user equipment (UE), associated with communicating with the satellite;
determining an updated value for an offset based at least in part on the timing misalignment;
updating the offset based on the updated value associated with an uplink-downlink timing interaction associated with the UE; and
transmitting an indication to the UE that the offset is to be used based at least in part on updating the offset.

20. The method of claim 19, further comprising:
receiving a request from the UE to update the offset; and
wherein transmitting the indication to the UE that offset is to be used comprises:
transmitting the indication to the UE that the offset is to be used based at least in part on receiving the request.

21. The method of claim 19, wherein transmitting the indication to the UE that the offset is to be used comprises:
transmitting a new data indicator (NDI) associated with a hybrid automatic repeat request process,
wherein a value of the NDI implicitly indicates that the offset is to be used.

22. The method of claim 19, wherein transmitting the indication to the UE that the offset is to be used comprises:
transmitting an explicit indication that the offset is to be used in:
a downlink control information communication,
a radio resource control communication, or
a medium access control control element communication.

23. The method of claim 22, further comprising:
receiving an acknowledgement of the explicit indication from the UE.

24. The method of claim 19, further comprising:
communicating with the UE using the offset after a particular time duration after transmitting the indication.

25. The method of claim 19, wherein the uplink-downlink timing interaction corresponds to at least one of:
a transmission timing for a physical uplink shared channel (PUSCH) scheduled by downlink control information,
a transmission timing for a PUSCH scheduled by a random access response,
a transmission timing for hybrid automatic repeat request (HARQ) feedback,
a medium access control control element action timing,
a transmission timing for channel state information (CSI) on a PUSCH,
a CSI reference resource timing, or
an aperiodic sounding reference signal transmission timing.

\* \* \* \* \*